US011933662B2

(12) United States Patent
Shi

(10) Patent No.: US 11,933,662 B2
(45) Date of Patent: Mar. 19, 2024

(54) LOAD CELL SCALE FOR WEIGHING WITH OVERLOAD PROTECTION

(71) Applicants: SHANGHAI TERAOKA ELECTRONIC CO., LTD., Shanghai (CN); Teraoka Seiko Co., Ltd., Tokyo (JP)

(72) Inventor: Guoxing Shi, Shanghai (CN)

(73) Assignees: Shanghai Teraoko Electronic Co., Ltd., Shanghai (CN); Teraoka Seiko Co., Ltd., Tokyo (JP)

( * ) Notice: Subject to any disclaimer, the term of this patent is extended or adjusted under 35 U.S.C. 154(b) by 423 days.

(21) Appl. No.: 17/269,512

(22) PCT Filed: Feb. 28, 2019

(86) PCT No.: PCT/JP2019/007929
§ 371 (c)(1),
(2) Date: Feb. 18, 2021

(87) PCT Pub. No.: WO2020/039624
PCT Pub. Date: Feb. 27, 2020

(65) Prior Publication Data
US 2021/0215530 A1 Jul. 15, 2021

(30) Foreign Application Priority Data
Aug. 21, 2018 (CN) .......................... 201810955649.7

(51) Int. Cl.
*G01G 23/00* (2006.01)
*G01G 3/12* (2006.01)
(Continued)

(52) U.S. Cl.
CPC ............. *G01G 23/005* (2013.01); *G01G 3/12* (2013.01); *G01G 3/1412* (2013.01); *G01L 1/26* (2013.01)

(58) Field of Classification Search
CPC ...... G01G 3/12; G01G 3/1412; G01G 23/005; G01L 1/26
(Continued)

(56) References Cited

U.S. PATENT DOCUMENTS 3,135,112 A * 6/1964 Farley ................... G01L 1/2243
73/862.633
4,367,801 A * 1/1983 Bryan ................... G01G 19/42
73/862.633
(Continued)

FOREIGN PATENT DOCUMENTS

CN 85108400 A 8/1986
CN 86103383 A 11/1986
(Continued)

OTHER PUBLICATIONS

Computer translation of JP S63-201543 downloaded from the JPO website on Aug. 29, 2023.*
(Continued)

*Primary Examiner* — Randy W Gibson
(74) *Attorney, Agent, or Firm* — Procopio, Cory, Hargreaves & Savitch LLP

(57) ABSTRACT

A load cell scale, has a columnar shaped load cell part having a upper surface and a lateral surface intersecting with the upper surface, the load cell part having a first load cell with a first weighting and a second load cell with a second weighting, and a stopper part for restricting deformation occurring in the load cell, wherein the load cell part further has a strain portion capable of elastically deforming, and wherein the stopper part is a plate-shaped member formed to extend along the longitudinal direction, the stopper portion has a fixing-end portion fixed to the lateral surface of the load cell; and a free-end portion separating from the fixing-end portion along the longitudinal axis, the free-end portion being configured to restrict the elastic deformation of the
(Continued)

load cell part due to the load in a state when the fixing-end portion is fixed to the lateral surface.

5 Claims, 26 Drawing Sheets

(51) Int. Cl.
*G01G 3/14* (2006.01)
*G01L 1/26* (2006.01)

(58) Field of Classification Search
USPC .................................................. 177/211, 229
See application file for complete search history.

(56) References Cited

U.S. PATENT DOCUMENTS

| | | | | |
|---|---|---|---|---|
| 4,632,198 A | | 12/1986 | Uchimura | |
| 4,660,667 A | | 4/1987 | Uchimura et al. | |
| 4,690,230 A | * | 9/1987 | Uchimura | G01G 19/42 |
| | | | | 177/229 |
| 4,693,330 A | * | 9/1987 | Uchimura | G01G 23/163 |
| | | | | 177/25.14 |
| 4,778,016 A | * | 10/1988 | Uchimura | G01G 23/005 |
| | | | | 177/186 |
| 5,052,505 A | * | 10/1991 | Naito | G01G 3/1412 |
| | | | | 73/862.633 |
| 8,561,482 B2 | * | 10/2013 | Aumard | G01G 3/1412 |
| | | | | 73/862.627 |
| 2006/0289207 A1 | | 12/2006 | Burkhard et al. | |
| 2015/0285695 A1 | | 10/2015 | Sato | |

FOREIGN PATENT DOCUMENTS

| | | |
|---|---|---|
| CN | 1337569 A | 2/2002 |
| CN | 1703612 A | 11/2005 |
| CN | 1789929 A | 6/2006 |
| CN | 201096513 Y | 8/2008 |
| CN | 201107105 Y | 8/2008 |
| CN | 201408067 Y | 2/2010 |
| CN | 203349919 U | 12/2013 |
| CN | 104603590 A | 5/2015 |
| CN | 204405152 U | 6/2015 |
| CN | 204612803 U | 9/2015 |
| CN | 106124020 A | 11/2016 |
| CN | 108414060 A | 8/2018 |
| CN | 108692798 A | 10/2018 |
| DE | 60009398 T2 | 5/2004 |
| EP | 1070945 A1 | 1/2001 |
| GB | 2087085 A | 5/1982 |
| JP | S62-32324 A | 2/1987 |
| JP | S63-201543 A | 8/1988 |
| JP | 05028937 U | 4/1993 |
| JP | H08043184 A | 2/1996 |
| JP | 2003214938 A | 7/2003 |
| JP | 2012117909 A | 6/2012 |
| JP | 2013061262 A | 4/2013 |
| WO | 2005121721 A1 | 12/2005 |
| WO | 2014068761 A1 | 5/2014 |
| WO | 2014068762 A1 | 5/2014 |

OTHER PUBLICATIONS

Office Action received in corresponding Japan Patent Application No. 2020-538020, dated Mar. 7, 2023, in 17 pages, with translation.
International Search Report for related PCT App No. PCT/JP2019/007929 dated May 7, 2019, 4 pgs.
Notification of the First Office Action for related CN App No. 2019101515987 dated Dec. 3, 2020, 20 pgs.

* cited by examiner

LOAD CELL SCALE FOR WEIGHING WITH OVERLOAD PROTECTION

CROSS-REFERENCE TO RELATED APPLICATIONS

This application is a U.S. National Stage entry of PCT Application No: PCT/JP2019/007929 filed Feb. 28, 2019, which claims priority to Chinese Patent Application No. 201810955649.7 filed Aug. 21, 2018, the contents of which are incorporated herein by reference.

FIELD OF THE INVENTION

BACKGROUND ART

A resolution when using a load cell scale to measure the weight of a weighted object is limited by a gravimetric sensor, more specifically, limited by a measurement range (maximum weight) of a load cell configuring the gravimetric sensor. In a general load cell scale, the gravimetric sensor has only one load cell. A tip end portion of the gravimetric sensor is connected to an upper beam thereof to receive a force from a weighing tray of the load cell scale, and a base end portion of the gravimetric sensor is connected to a lower beam thereof to be fixed to a base plate of the load cell scale. For example, an electronic scale having a weighting of five kilograms (kg) generally has the resolution less than 1 gram (g). On the other hand, with respect to an electronic scale having a resolution of about 0.01 grams, the weighting thereof is generally suitable for weighting a weighted object of several hundred grams. In other words, the gravimetric sensor in a conventional load cell scale can only weight the weighted object with a single resolution.

In Patent Document 1, a double-weighting electronic scale configured from two gravimetric sensors having different resolutions is disclosed. According to the electronic scale disclosed in Patent Document 1, in at case when a weighted object whose weight is less than a predetermined weight, the weighted object is only supported by the gravimetric sensor having a smaller weighting so as to measure the weight of the weighted object. On the other hand, in a case when the weighted object whose weight is more than the predetermined weight, the weighted object is supported by both of the gravimetric sensors so as to measure the weight of the weighted object.

[Citation List]
[Patent Documents]
[Patent Document 1]
 Chinese Patent Application Publication No. 106124020A

SUMMARY OF INVENTION

[Technical Problem]

However, according to the electronic scale disclosed in Patent Document 1, there is no mechanism configured to protect the two gravimetric sensors by limiting the deformation of the two gravimetric sensors. More specifically, according to the electronic scale disclosed in Patent Document 1, in the case of placing the weighted object whose weight is more than the weighting of the two gravimetric sensors on the weighting tray, or an intentioned impact is applied on the weighting tray, there is a possibility that permanent strain occurs in the two gravimetric sensors since the maximum deflection of each of the two weight sensors due to the force beyond the maximum deflection of each of the two weight sensors.

According to the electronic scale disclosed in Patent Document 1, since the gravimetric sensor whose weighting is larger is supported by a spring which does not have rigidity, for example, in a case when a 10 kg weighted object is placed on the weighting tray, the weighting process becomes unstable due to the vibration of the spring. Similarly, since a criterion for switching the two gravimetric sensors having different weightings is determined only by an elastic force of the spring, there is a possibility that the switching of the two gravimetric sensors is not correctly performed. Accordingly, there is a problem that according to the electronic scale disclosed in Patent Document 1, the weighting result may be incorrect and it is not suitable for being used in a commercial environment due to a short service life.

The present invention is made in consideration of the foregoing circumstance, and an object of the present invention is to provide a load cell configured to be able to restrict the deformation occurring in the load cell even if in a case when a load exceeding the weighting is applied thereto, and a load cell scale having the load cell. Also, the present invention is made to achieve an object to provide a load cell scale configured to have a plurality of load cells having different weightings so as to switch among the different weightings and perform the weighting of the weighted object correctly.

[Solution to Problem]

According to a first aspect of the present invention, a load cell scale includes a load cell part formed in a columnar shape, the load cell part having a upper surface extending along a longitudinal axis and a lateral surface intersecting with the upper surface, and a stopper part configured to restrict deformation occurring in the load cell due to a load exceeding a predetermined value and applied to the load cell, wherein the load cell part has a strain portion capable of elastically deforming and the strain portion penetrates the load cell part from the lateral surface in a short direction orthogonal to the longitudinal direction, and wherein the stopper portion is provided to be connected to the lateral surface of the load cell part.

According to a second aspect of the present invention, in the load cell scale according to the first aspect, the stopper part may be a plate-shaped member formed to extend along the longitudinal axis, and the stopper part may have a fixing-end portion fixed to the lateral surface of the load cell and a free-end portion separating from the fixing-end portion along the longitudinal axis, the free-end portion being configured to restrict the elastic deformation of the load cell part due to the load in a state when the fixing-end portion is fixed to the lateral surface. When the dimensions of the stopper part in a height direction orthogonal to the upper surface is defined as a width of the stopper part, the stopper part may have a first width at the fixing-end portion and a second width in a range where the strain portion is formed along the longitudinal axis, and the first width of the stopper part is larger than the second width of the stopper part.

According to a third aspect of the present invention, in the load cell scale according to the second aspect, the fixing-end portion of the stopper part may have a third width between the first width and the second width.

According to a fourth aspect of the present invention, in the load cell scale according to any one from the first aspect to the third aspect, the load cell part may have a position-restriction member formed to extend from the lateral surface in the short direction, the stopper part may have a position-restriction hole formed in the free-end portion and having a width suitable for the position-restriction member to enter, wherein when the load less than the predetermined value is applied to the load cell part, the position-restriction member may be at a position movable into the position-restriction hole, and when the load equal to or larger than the predetermined value is applied to the load cell part, the position-restriction member may be engaged with the position-restriction hole.

According to a fifth aspect of the present invention, in the load cell scale according to any one from the first aspect to the fourth aspect, the stopper part may have a position-restriction tank configured to restrict an operation of the free-end portion, and the free-end portion may be in the position-restriction tank in the height direction.

According to a sixth aspect of the present invention, in the load cell scale according to any one from the first aspect to the fifth aspect, an engaging hole for connecting the stopper part may be formed in the lateral surface of the load cell part, the stopper part may have an engaging member at the fixing-end portion that is capable of engaging with the engaging hole, and the stopper part may be connected to the lateral surface of the load cell part by engaging the engaging member with the engaging hole.

According to a seventh aspect of the present invention, in the load cell scale according to any one from the first aspect to the sixth aspect, the lateral surface of the load cell part may have a groove formed along the direction of the longitudinal axis and in a range where the strain portion is formed in the height direction orthogonal to the upper surface, and the stopper part may be disposed to be accommodated in the groove.

According to an eighth aspect of the present invention, the load cell scale according to any one from the first aspect to the seventh aspect may further have an intermediate member formed to be sandwiched between the load cell part and a portion where the stopper part is fixed to the lateral surface along the short direction.

According to a ninth aspect of the present invention, in the load cell scale according to any one from the first aspect to the eighth aspect, the load cell part may be configured by configuring a first load cell having a first weighting and a second load cell having a second weighting that is larger than the first weighting along the direction of the longitudinal axis or the height direction, the stopper part may have a first stopper and a second stopper corresponding to the first load cell and the second load cell respectively, and the fixing-end portion of the first stopper and the free-end portion of the second stopper may be adjacent to each other.

According to a tenth aspect of the present invention, in the load cell scale according to the ninth aspect, a first length of the first stopper along the direction of the longitudinal axis of the first stopper may be different from a second length of the second stopper along the direction of the longitudinal axis of The second stopper.

According to an eleventh aspect of the present invention, in the load cell scale according to the ninth aspect or the tenth aspect, when the load being less than the first weighting is applied to the first load cell, the elastic deformation may occur in the first load cell and the free-end portion of the first stopper may move with respect to the first load cell, and when the load being larger than the first weighting and less than the second weighting is applied to the first load cell, the elastic deformation may occur in the second load cell and the free-end portion of the second stopper may move with respect to the second load cell in a state in which the first stopper and the first load cell are engaged with each other.

According to a twelfth aspect of the present invention, in the load cell scale according to any from the ninth aspect to the eleventh aspect, the first load cell and the second load cell may have a first position-restriction member and a second position-restriction member respectively, the first stopper and the second stopper may have a first position-restriction hole and a second position-restriction hole formed in the free-end portions of the first stopper and second stopper and having widths suitable for the first position-restriction member and the second position-restriction member to enter respectively, when the load less than the first weighting is applied to the load cell part, the first position-restriction member and the second position-restriction member may be movable in the first position-restriction hole and the second position-restriction hole respectively, when the load equal to or larger than the first weighting and less than the second weighting is applied to the load cell part, the first position-restriction member may be engaged with the first position-restriction hole and the second position-restriction member may be movable in the second position-restriction hole, and when the load larger than the second weighting is applied to the load cell part, the first position-restriction member and the second position-restriction member may engage with the first position-restriction hole and the second position-restriction hole respectively.

According to a thirteenth aspect of the present invention, the load cell scale according to any one from the ninth aspect to the twelfth aspect may further include a protection member fixed to the first load cell, and when the load larger than the first weighting is applied, the first load cell and the protection member may operate simultaneously to prevent the deformation occurring in the first load cell.

According to a fourteenth aspect of the present invention, in the load cell scale according to any one from the ninth aspect to the thirteenth aspect, the second topper of the second load cell may have a third width between the first width and the second width in the fixing-end portion.

[Advantageous Effects of the Invention]

According to the load cell disclosed in the above-described aspects, even if in a case when the load exceeding the weighting is applied, it is possible to restrict the deformation occurring in the load. Also, according to the above-described aspects, in the load cell scale configured from the plurality of load cells having different weightings, it is possible to accurately switch the weightings and measure the weighting of the weighted object.

DETAILED DESCRIPTION OF THE INVENTION

Figure 1:
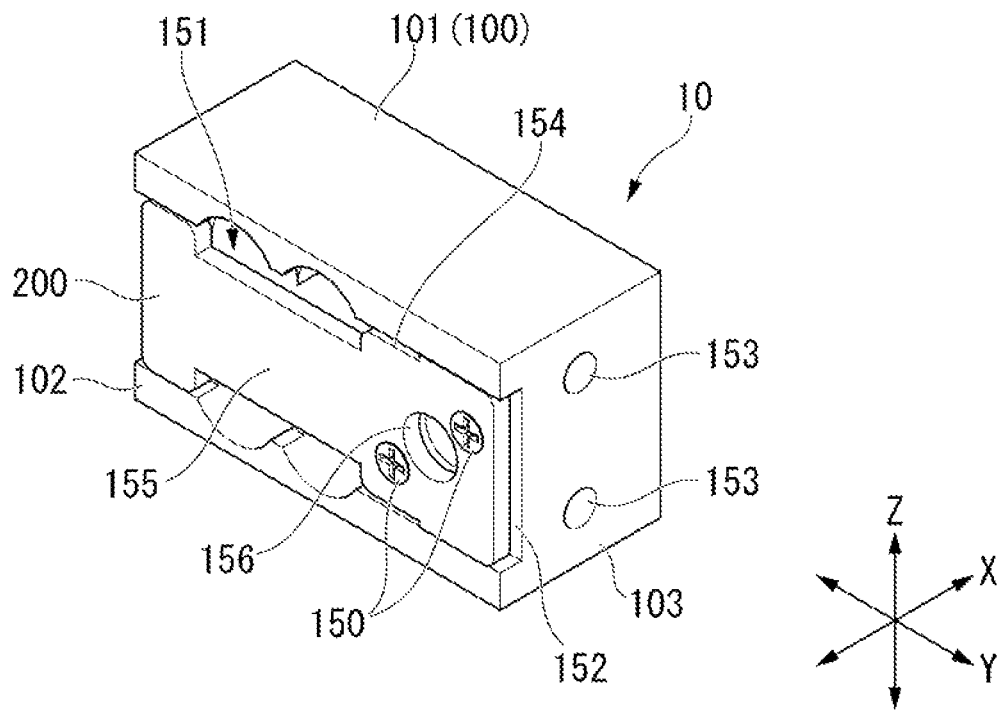
FIG. 1 is a perspective view showing a configuration of a load cell according to a first embodiment of the present invention.
Figure 2:
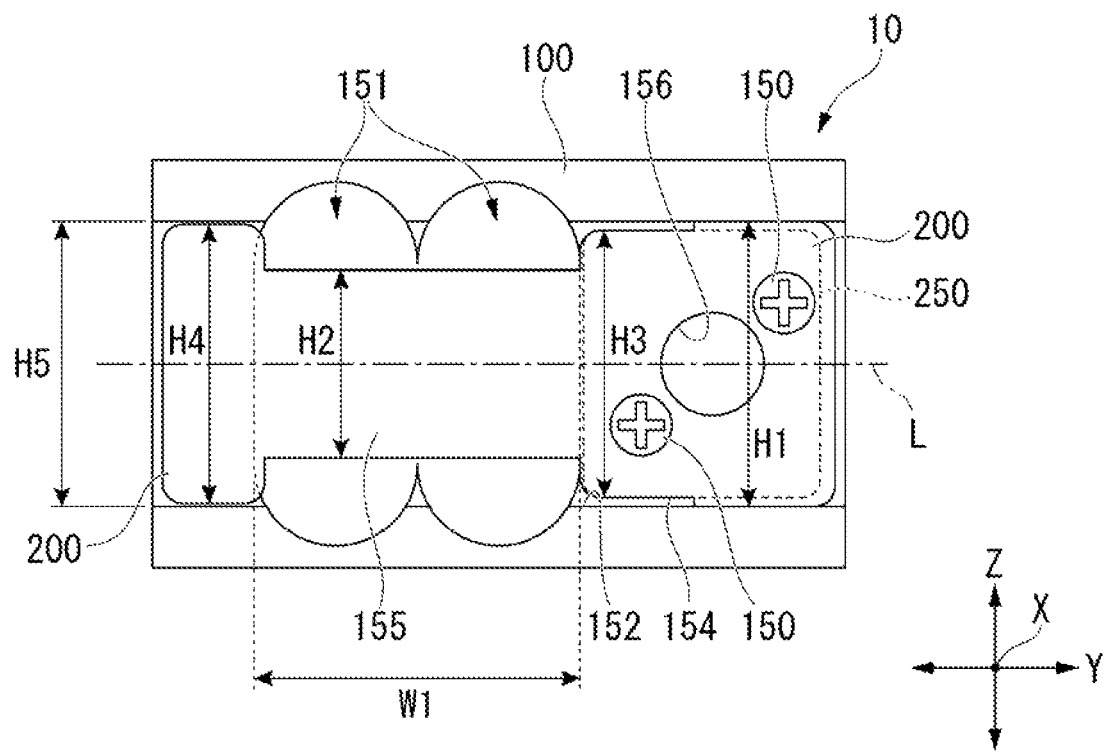
FIG. 2 is a front view showing the load cell according to the present embodiment.
Figure 3:
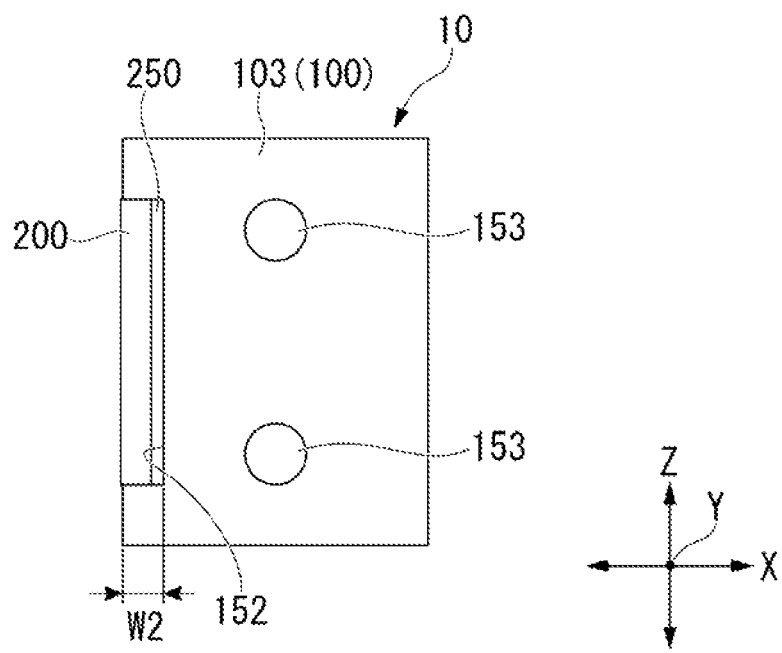
FIG. 3 is a side view viewing an end portion of the load cell along a direction of a longitudinal axis according to the present embodiment.

A load cell 10 and a load cell scale 1 configured by having the load cell 10 according to a first embodiment of the invention will be described with reference to the enclosed FIGS. 1-3. FIG. 1 is a perspective view showing the load cell 10 according to the present embodiment. FIG. 2 is a front view showing the configuration of the load cell 10. FIG. 3 is a side view showing the configuration of the load cell. In the present embodiment, a direction along the Y-axis shown in FIG. 1 is defined as a direction of a longitudinal axis of the load cell 10, a direction along the X-axis that is orthogonal to the direction along the Y-axis is defined as a short direction of the load cell 10, and a direction orthogonal to a plane defined by the X-axis and the Y-axis is defined as a height direction. Also, according to the present embodiment, as shown in FIG. 2, an end portion at the left side of the load cell 10 along the direction along the Y-axis is defined as a tip end, and an end portion at the right side of the load cell 10 is defined as a base end.

As shown in FIG. 1, the load cell 10 has a columnar body 100 having a square pole shape formed to extend in the direction of the longitudinal axis (that is, in the direction of Y-axis) and a stopper member 200 connected to the columnar body 100. For example, the columnar body 100 and the stopper member 200 of the load cell 10 are members having rigidity and being formed from various metal materials. As shown in FIG. 2, the columnar body 100 is formed to extend in the direction of the longitudinal axis L (that is, in the direction of Y-axis).

As shown in FIG. 1, the columnar body 100 has an upper surface 101 formed to extend along the longitudinal axis L, a lateral surface 102 formed to be orthogonal to the upper surface 101, and an end surface 103 orthogonal to both of the upper surface 101 and the lateral surface 102. According to the present embodiment, the upper surface 101 is formed in a plane defined by the X-axis and the Y-axis, the lateral surface 102 is formed in a plane defined by the Y-axis and the Z-axis, and the end surface 103 is formed in a plane defined by the X-axis and the Z-axis.

As shown in FIGS. 1 and 2, a penetration hole 151 is formed by cutting off part of the columnar body 100 inwardly from the lateral surface 102 along the short direction of the columnar body 100 (that is, along the direction of X-axis). As shown in FIG. 2, according to the present embodiment, in a case of viewing the penetration hole 151 formed in the columnar body 100 from the direction of X-axis, an internal circumferential surface of the penetration hole 151 has a shape formed by arranging two substantial semicircular shape along the longitudinal axis L. The internal surface of the penetration hole 151 is symmetrical with respect to the longitudinal axis L as a symmetry axis. According to the present embodiment, for example, sensors configured to transform a deformation volume or a stress in response to the deformation of the columnar body 100 into electrical signals are disposed in the internal circumferential surface of the penetration hole 151. Accordingly, when a weighted object (see FIG. 10) having a weight M is placed on the load cell scale 1 so as to perform a measurement, the weight of the weighted object is applied to the load cell 10 as a load such that micro deformation occurring in the columnar body 100 is transformed into the electrical signals by the sensors disposed in the internal circumferential surface of the penetration hole 151.

The load cell scale 1 is configured to measure the weight (mass) of the weighted object by detecting the electrical signals. Generally, as shown in FIG. 2, a width W1 of the penetration hole 151 along the direction of the longitudinal axis may be determined in correspondence with the weight of the weighted object. In other words, for example, in a case in which a percentage of the width W1 with respect to the width of the columnar body 100 in the direction of the longitudinal axis is relatively high, the deformation volume of the columnar body may be large so as to perform a weighting with a low weighting. On the other hand, in a case in which a percentage of the width W1 with respect to the width of the columnar body 100 in the direction of the longitudinal axis is relatively low, the deformation volume of the columnar body may be small so as to perform a weighting with a high weighting. According to the present embodiment, the part of the load cell 10 where the penetration hole 151 is formed functions as a strain portion being elastic deformable. In other words, it is possible to measure the weight M of the weighted object by detecting and measuring the elastic deformation volume occurring in the penetration hole 151 of the load cell 10.

In the load cell 10, a groove portion 152 is formed by cutting off part of the columnar body 100 from the lateral surface 102 inwardly along the direction of the longitudinal axis (that is, the Y-axis direction) of the columnar body 100. According to the present embodiment, as shown in FIG. 3, the groove portion 152 has a depth W2 in the short direction of the columnar body 100 which is suitable to accommodate at least part of the stopper member 200. According to the present embodiment, it is preferable to set the sum of the width of the stopper member 200 and the width of an intermediate member 250 described below to be substantially the same as the depth W2 of the groove portion 152; however, the present embodiment is not limited thereto.

Also, as shown in FIG. 2, the groove portion 152 has a uniform width H5 in the height direction (that is, the Z-axis direction) of the load cell 10. According to the present embodiment, the width H5 of the groove portion 152 is at least larger than a width H4 of a tip end portion (free-end portion) of the stopper member 200 described below.

As shown in FIGS. 1-3, according to the present embodiment, the stopper member 200 is connected and fixed to the columnar body 100 in a state in which the stopper member 200 is disposed in the groove portion 152 formed in the columnar body 100. As shown in FIG. 2, the stopper member 200 has a substantial I shape. In the height direction of the load cell 10, the stopper member 200 has a width H1 at the base end portion (fixing-end portion), a width H2 of a waist portion 155 formed in the range where the penetration hole 151 is formed, a width H3 of a step portion 154 formed at the base end portion, and a width H4 at the tip end portion (free-end portion). According to the present embodiment, in order to make the description easy, an example that the width H1 and the width H4 of the stopper member 200 are substantially the same will be described; however, the present embodiment is not limited thereto. For example, the width H1 at the base end portion of the stopper member 200 may be substantially the same with the width H5 of the groove portion 152. In the stopper member 200, the width H1 of the base end portion is larger than the width H2 of the waist portion 155. In the stopper member 200, in the range where the penetration hole 151 of the columnar body 100 is formed, the width H2 of the waist portion 155 is smaller than the width of the penetration hole 151. Accordingly, even in a case in which the stopper member 200 is connected and fixed to the columnar body 100, it is possible to adjust the weighting (for example, the maximum weighting) that can be measured by the load cell 10 by inserting a tool into a gap between the stopper member 200 and the internal circumferential surface of the penetration hole 151 so as to process the internal circumferential surface of the penetration hole 151 into the substantial semicircular shape. Furthermore, it is possible to adjust minute deficiencies such as four-corner errors by processing (perform a cutting processing) the internal circumferential surface of the penetration hole 151 using a file. Such a processing is an essential processing during the procedures to manufacture the load cell and the processing has to be performed in a state in which the stopper member 200 is attached to the load cell such that it is possible to avoid the attachment and detachment of the stopper member 200 every time when the adjustment is performed so as to save time and labor by providing the waist portion 155.

In the stopper member 200, the width H4 at the tip end portion (free-end portion) is smaller than the width H5 of the groove portion 152. Accordingly, in a case in which the weighted object is not disposed on the load cell scale 1, the tip end portion of the stopper member 200 is separated from the internal circumferential surface for a predetermined interval in the groove portion 152. When the weighted object is disposed on the load cell scale 1, the load due to the weight M of the weighted object applies on the load cell 10 such that elastic deformation occurs across the whole length of the columnar body 100 along the direction of the longitudinal axis. However, even in this state, in the columnar body 100, the width H5 of the groove portion 152 is still maintained across the whole length of the columnar body 100. In other words, a downward displacement amount along the height direction of the load cell 10 occurring at the tip end side of the columnar body 100, particularly in the structure in the penetration hole (strain portion) 151 and in the vicinity thereof is different from the downward displacement amount along the height direction of the load cell 10 occurring at the base end side of the columnar body 100, in other words, in the structure connected and fixed to the fixing-end portion of the stopper member 200. In the columnar body 100, since the displacement amount at the tip end side where the load is directly applied is larger than the displacement amount at the base end side, in the penetration hole 151 formed at the tip end side of the columnar body 100 and the structure in the vicinity thereof, the gap between the stopper member 200 and the internal circumferential surface of the groove portion 152 of the columnar body 100 becomes smaller following the increase of the weight M of the weighted object disposed on the load cell 10 such that the internal circumferential surface of the groove portion 152 approaches the free-end portion formed at the tip end side of the stopper member 200. According to the present embodiment, when the weight M of the weighted member increases to be substantially the same with the maximum weighting of the load cell 10, the columnar body 100 and the stopper member 200 becomes an integrated configuration since the free-end portion of the stopper member 200 almost contacts with the internal circumferential surface of the groove portion 152.

According to the present embodiment, when the columnar body 100 and the stopper member 200 becomes to the integrated configuration, there is no further deformation occurring in the penetration hole 151 even if the load (the weight M of the weighted object) applied to the load cell further increases. In other words, even if the weighted object having the weight large than the maximum weighting of the load cell 10 is disposed on the load cell 10, there is no deformation exceeding an elastic deformation limit of the load cell 10 occurring in the load cell 10. In other words, due to the configuration of disposing the free-end portion of the stopper member 200 in the groove portion 152, in the case of applying the load larger than the maximum weighting of the load cell 10 on load cell 10, it is possible to avoid the reasons a permanent strain and a fatigue breakdown in the penetration hole (strain portion) 151 of the columnar body 100 is introduced.

Accordingly, for example, it is possible to suitably determine the width H4 of the free-end portion formed at the tip end portion of the stopper member 200 by measuring a maximum strain amount of the columnar body 100 when the load equivalent to the maximum weighting of the load cell 10 is applied to the load cell 10 and the width H5 of the groove portion 152 at the time.

As shown in FIGS. 1 and 2, a step portion 154 having the width H3 smaller than the width H1 is formed at the tip end side in the base end portion of the stopper member 200 The length of the step portion 154 along the direction of the longitudinal axis of the load cell 10 may be suitably determined as required.

As shown in FIG. 2, the step portion 154 is configured to secure a predetermined clearance between the base end portion of the stopper member 200 and the internal circumferential surface of the groove portion 152 in the Z-axis direction. More specifically, for example, in a case in which the step portion 154 is not provided in the base end portion of the stopper member 200, due to tolerance during the manufacturing of the member and the like, before the load of the weighted object is applied on the load cell 10, there is possibility that the base end portion of the stopper 200 unintentionally comes in contact with the internal circumferential surface of the groove portion 152 such that the base end portion of the stopper 200 and the internal circumferential surface of the groove portion 152 press each other. In this case, even if the weighted object is disposed on the load cell 10, there is possibility that the weight M of the weighted object is not correct reflected by the detected deformation amount generated in the penetration hole (strain portion) 151 of the columnar body 100.

On the other hand, according to the present embodiment, it is possible to prevent the base end portion of the stopper member 200 and the internal circumferential surface of the groove portion 152 from unintentionally contacting with each other. Accordingly, when the weighted object is disposed on the load cell 10, the deformation amount of the strain portion of the columnar body 100 may be corrected recognized. Also, since the step portion 154 is formed in only part of the base end portion of the stopper member 200, it is possible to retain the rigidity of the stopper member 200.

As shown in FIGS. 2 and 3, in the short direction (X-axis direction) of the load cell 10, a plate-shaped intermediate member 250 is provided to be sandwiched between the base end portion of the stopper member 200 and the columnar body 100. The intermediate member 250 is a plate-shaped member having rigidity and a thickness about several millimeters. As shown in FIG. 2, according to the present embodiment, an example that the intermediate member 250 has a substantial same shape and area with the base end portion of the stopper member 200 is described, the present embodiment is not limited thereto. More specifically, due to the intermediate member 250 disclosed in the present embodiment, the base end portion of the stopper member 200 and the groove portion 152 of the columnar body 100 are separated from each other in the short direction of the load cell 10 such that a separating state between the free-end portion formed at the tip end side of the stopper member 200 and the groove portion 152 is maintained. The intermediate portion 250 only has to be sandwiched and fixed between the base end portion of the stopper member 200 and the columnar body 100 in the short direction of the load cell 10, and the shape and the dimension thereof is not particularly limited.

According to the present embodiment, the load cell 10 has the intermediate member 250 such that in the short direction of the load cell 10, it is possible to prevent the free-end portion formed at the tip end side of the stopper member 200 from unintentionally contacting with the columnar body 100. Accordingly, since the load cell 10 has the intermediate member 250, it is possible to correctly determine the elastic deformation amount of the penetration hole (strain portion) 151 of the columnar body 100 when the weighted object is disposed on the load cell scale 1.

As shown in FIG. 2, in the load cell 10, the base end portion of the columnar body 100, the intermediate member 250, and the fixing-end portion formed in the base end portion of the stopper member 200 are connected and fixed by a fixing mechanism 150. According to the present embodiment, the fixing mechanism 150 has a threaded screw hole which is formed to penetrate the fixing-end portion of the stopper member 200 and the intermediate portion 250 and have a predetermined depth at the base end side of the columnar body 100, and a screw being engageable with the threaded screw hole. Accordingly, at the time of assembling the load cell 10, it is easy to adjust an engagement state of the columnar body 100, the intermediate member 250, and the stopper member 200 by operations of tightening the screw or loosening the screw only. More specifically, for example, a relative position of the free-end portion of the stopper member 200 with respect to the groove portion 152 may be adjusted by adjusting the tightening degree of the two screws.

According to the present embodiment, the method of connecting the columnar body 100, the intermediate member 250, and the stopper member 200 is not limited to the fixing mechanism 150. For example, an amount of the threaded screw holes and the positions of the threaded screw holes in the fixing mechanism 150 may be suitably adjusted, and other engagement method besides the screw may be adopted. Also, for example, the stopper member 200, the intermediate member 250, and the columnar body 100 may be directly connected by methods such as the welding and the like.

As shown in FIG. 2, the load cell 10 has a wiring hole 156 penetrating the base end side of the columnar body 100, the intermediate member 250, and the fixing-end portion of the stopper member 200. The wiring hole 156 is suitably formed as desired and it not particularly limited. For example, the wiring hole 156 is provided for inserting wirings therethrough so as to transmit the signals detected by the sensors provided on the internal circumferential surface of the penetration hole 151 of the columnar body 100 or the necessary signals for controlling the load cell scale 1. According to the present embodiment since the wiring hole 156 is formed in a base-end fixing portion at the base end side of the stopper member 200, that is, the wiring hole 156 is formed in a range where the rigidity is relatively large in the load cell 10 and at a position separated from the penetration hole 151 as the strain portion by a predetermined interval, it is possible to prevent the wirings passing through the wiring hole 156 from unintentionally contacting with the surrounding configurations so as to suppress the effect of the measurement of the deformation amount generated in the strain portion of the load cell 10 and improving the precision of the weighting result of the weighted object.

As shown in FIGS. 1 and 3, in the load cell 10, two connection holes 153 are formed in the end surface 103 at the base end side thereof. The two connection holes 153 are formed to connect the load cell 10 to a lower support member 30 (see FIG. 10). At the time of assembling the load cell scale 1, the load cell 10 is fixed to a base plate 50 (see FIG. 10) via the lower support member 30. Furthermore, although it is not disclosed in figures, the connection hole 153 is also formed in the end surface at the tip end side of the load cell 10. Accordingly, the load cell 10 is connected to a weighting tray 40 (see FIG. 10) via an upper support member 20.

(Effect According to First Embodiment)

As described above, at the time of assembling the load cell scale 1 according to the present embodiment, the load cell 10 is connected to the weighting tray 40 via the upper support member 20 and the load cell is supported by the base plate 50 via the lower support member 30. The upper support member 20, the lower support member 30, the weighting tray 40, and the base plate 50 may be configured by adopting various conventional configurations.

The load cell scale 1 according to the present embodiment has the above-described configurations so as to correctly measure the weight M of the weighted object that is smaller than the maximum weighting of the load cell 10. On the other hand, in the case when the weighted object heavier than the maximum weighting of the load cell 10 is disposed on the weighting tray 40, or an unintentional impact is applied on the weighting tray 40, it is possible to avoid the permanent strain and malfunctions occurring in the load cell 10.

More specifically, the load cell 10 according to the present embodiment has the stopper member 200, wherein at least part of the stopper member 200 is accommodated in the groove portion 152 formed by cutting off part of the columnar body 100 inwardly from the lateral surface 102 of the columnar body 100 in the short direction. In the groove portion 152, a tip-end free portion of the stopper member 200 is separated from the internal circumferential surface of the groove portion 152 by a predetermined interval such that when the weighted object is disposed on the weighting tray 40, the tip-end free portion of the stopper member 200 relatively moves with respect to the internal circumferential surface of the groove portion 152. In the case when the weighted object heavier then the maximum weighting of the load cell 10 is disposed on the weighting tray 40, the tip-end free portion of the stopper member 200 contacts with the internal circumferential surface of the groove portion 152 such that the stopper member 200 and the columnar body 100 become an integrated configuration. In this state, the stopper member 200 may prevent unintentional deformation occurring in the penetration hole 151 configured as the strain portion of the columnar body 100. The stopper member 200 is connected and fixed to the lateral surface 102 of the columnar body 100 so as to suppress the dimension of the load cell 10 in the height direction and it is effective for the thinning of the load cell scale 1.

According to the present embodiment, the stopper member 200 has the step portion 154 formed in part of the fixing-end portion at the base end side. The load cell 10 has the intermediate member 250 configured to be sandwiched between the stopper member 200 and the columnar body 100 in the short direction. At the time of weighting the weighted object, the step portion 154 and the intermediate member 250 exclude other elements except the weight M of the weighted object that may affect the accuracy of measuring the deformation amount of the penetration hole 151 as the strain portion of the columnar body 100 due to the unintentional contact of the stopper member 200 and the columnar body 100.

According to the present embodiment, the stopper member 200 has the waist portion 155 formed in the substantial I shape between the tip-end free portion and the base-end fixing portion. Accordingly, at the time of assembling the load cell 10, even if in that state when the stopper member 200 is fixed to the columnar body 100, in the range where the waist portion 155 is formed in the direction the longitudinal axis, there is enough gap between the waist portion 155 and the penetration hole 151 for inserting the tool thereto to adjust the shape of the internal circumferential surface of the penetration hole 151. Furthermore, as described above, in the load cell 10 according to the present embodiment, it is possible to adjust the engagement of the stopper member 200, the intermediate member 250, and the columnar body 100 by adjusting the screws provided in the fixing mechanism 150.

Accordingly, at the time of assembling the load cell scale 1 according to the present embodiment, or at the time of performing maintenance to the load cell scale 1, it is possible to adjust the strain portion of the load cell 10 by easy operations. In other words, it is possible to reduce the manufacturing cost and the maintenance cost with respect to the load cell 10 and the load cell scale 1 having the load cell 10 according to the present embodiment.

(First Modification Example of First Embodiment)

Hereinafter, a configuration of a load cell 10A according to a first modification example of the present embodiment will be described with reference to FIG. 4. The same configurations with the load cell 10 according to the above-described first embodiment will be given to the same reference signs and the description will be omitted, and configurations different from the above-described embodiment will be described.

Figure 4:
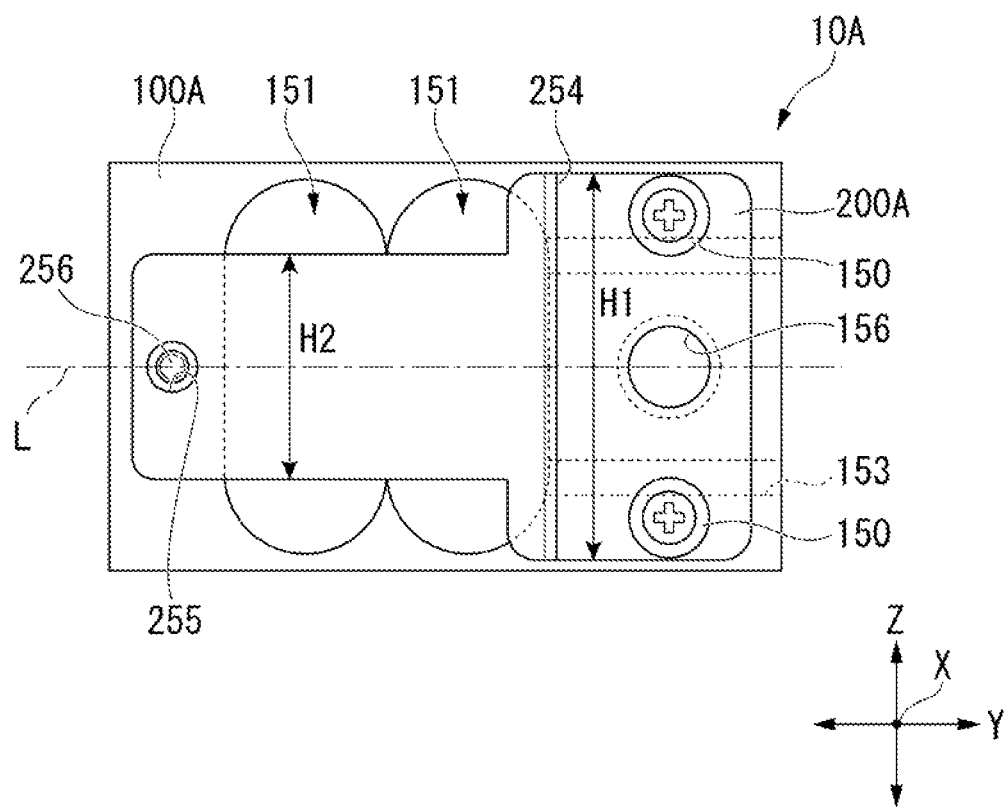
FIG. 4 is a front view showing a configuration of a load cell disclosed in a first modification example of the present embodiment.

As shown in FIG. 4, the load cell 10A according to the present modification example is different from the load cell 10 according to the above-described first embodiment in that the groove portion is not formed in a columnar body 100A and a stopper member 200A is formed in a substantial T shape.

More specifically, as shown in FIG. 4, at a more tip end side than the penetration hole 151 of the columnar body 100A of the load cell 10A according to the present embodiment, a protrusion 256 protruding outwardly from the lateral surface 103 in the short direction is formed. On the other hand, the stopper member 200A of the load cell 10A according to the present embodiment has the base-end fixing portion formed to have the width H1 in the height direction of the load cell 10A and the waist portion 155 having the width H2 smaller than the width H1. A penetration hole 255 having an inner diameter (width) suitable for the protrusion 256 to enter is formed at the tip end side of the waist portion 155 of the stopper member 200A.

In the direction of the longitudinal axis of the load cell 10A, a step portion 254 is formed between the base-end fixing portion of the stopper member 200A and the waist portion 155. According to the present modification example, for example, the stopper member 200A may be formed by bending a plate-shaped member formed from the metal material having rigidity at the step portion 254.

Similar to the load cell 10 according to the above-described first embodiment, the base-end fixing portion of the load cell 10A according to the present embodiment is fixed to the columnar body 100A by the fixing mechanism 150. On the other hand, since the step portion 254 is formed in the stopper member 200A, the waist portion 155 and the tip-end free portion of the stopper member 200A are separated from the lateral surface of the columnar body 100A by a predetermined interval in the short direction of the load cell 10A. That is, in the load cell 10A according to the present modification example, it is not necessary to provide the intermediate member 250 between the base-end fixing portion of the stopper member 200A and the columnar body 100A.

However, the configuration of the load cell 10A according to the present modification example is not limited thereto. For example, the step portion 254 may not formed in the stopper member 200A of the load cell 10A according to the present modification example, and the intermediate member 250 may be provided between the base-end fixing portion of the stopper member 200A and the lateral surface of the columnar body 100A.

(Effect of First Modification Example)

The load cell 10A according to the present modification example has the above-described configuration such that the same effect with the load cell according to the above-described first embodiment is achieved. More specifically, according to the load cell scale having the load cell 10A according to the present modification example, when the weighted object with a weight less than the maximum weighting of the load cell 10A is disposed on the weighting tray to be weighted, due to the elastic deformation occurring in the strain portion (penetration hole 151) of the columnar body 100A of the load cell 10A, the protrusion 256 formed in the columnar body 100A relatively moves in the penetration hole 255 of the stopper member 200A. Accordingly, similar to the load cell 110 according to the above-described first embodiment it is possible to measure the weight M of the weighted object by detecting the elastic deformation amount of the strain portion.

Figure 13:
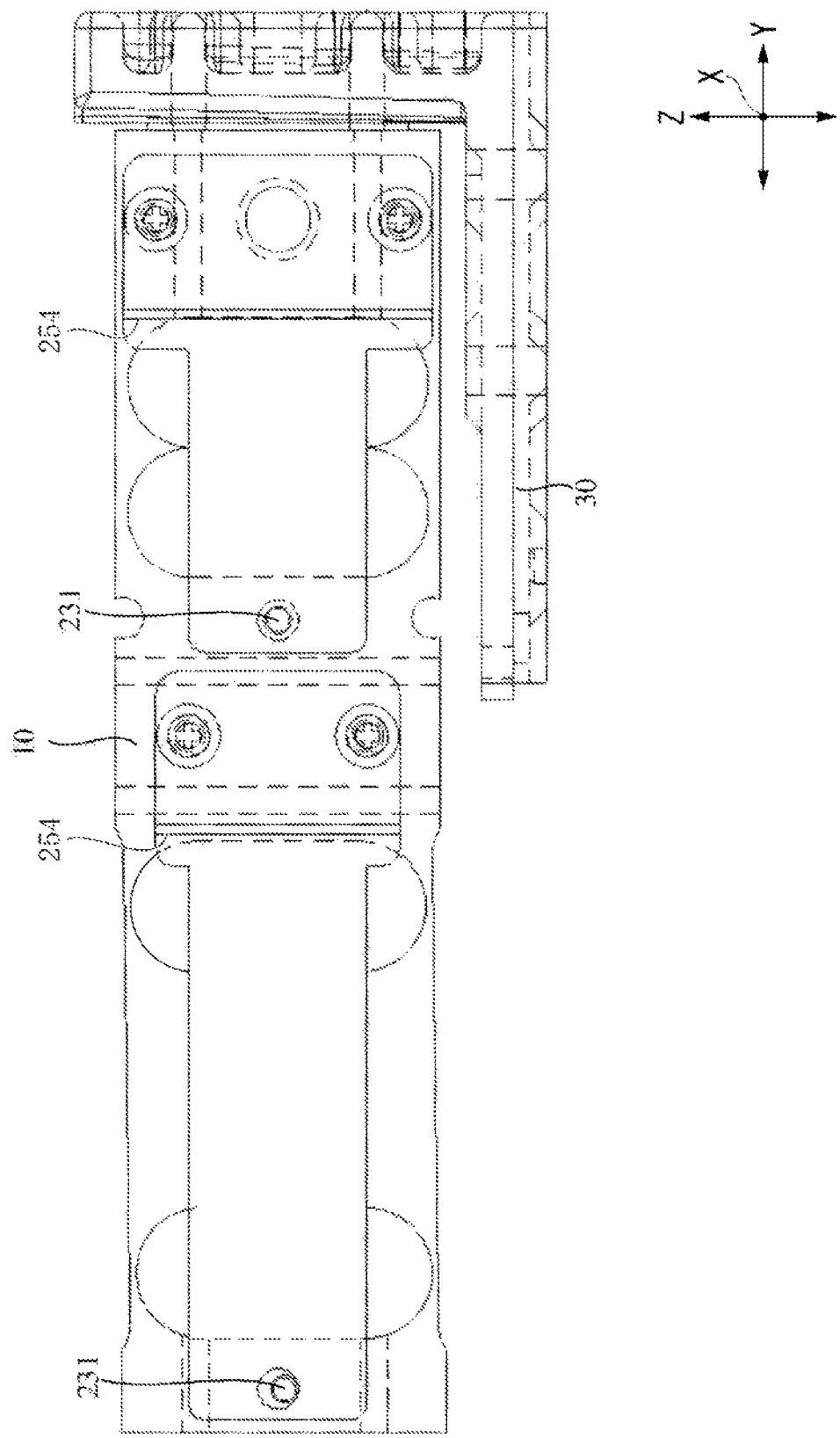
FIG. 13 is a front view showing the operation of the load cell according to the present modification example.

On the other hand, when the weighted object having a weight larger than the maximum weighing scale of the load cell 10A is disposed on the weighting tray, the protrusion 256 formed in the columnar body 100A contacts the internal circumferential surface of the penetration hole 255 of the stopper member 200A and the columnar body 100A and the stopper member 200A become an integrated configuration so as to restrict the further deformation of the strain portion (see FIG. 13). Accordingly, according to the load cell 10A according to the present modification example, when the weighted object heavier than the maximum weighting is disposed on the weighting tray or the unintentionally impact is applied on the weighting tray, it is possible to avoid the permanent strain and malfunctions occurring in the load cell 10A.

(Second Modification Example of First Embodiment)

Hereinafter, a configuration of a load cell 10B according to a second modification example of the present embodiment will be described with reference to FIG. 5. The same configurations with the load cell 10 according to the above-described first embodiment will be given to the same reference signs and the description will be omitted, and configurations different from the above-described embodiment will be described.

Figure 5:
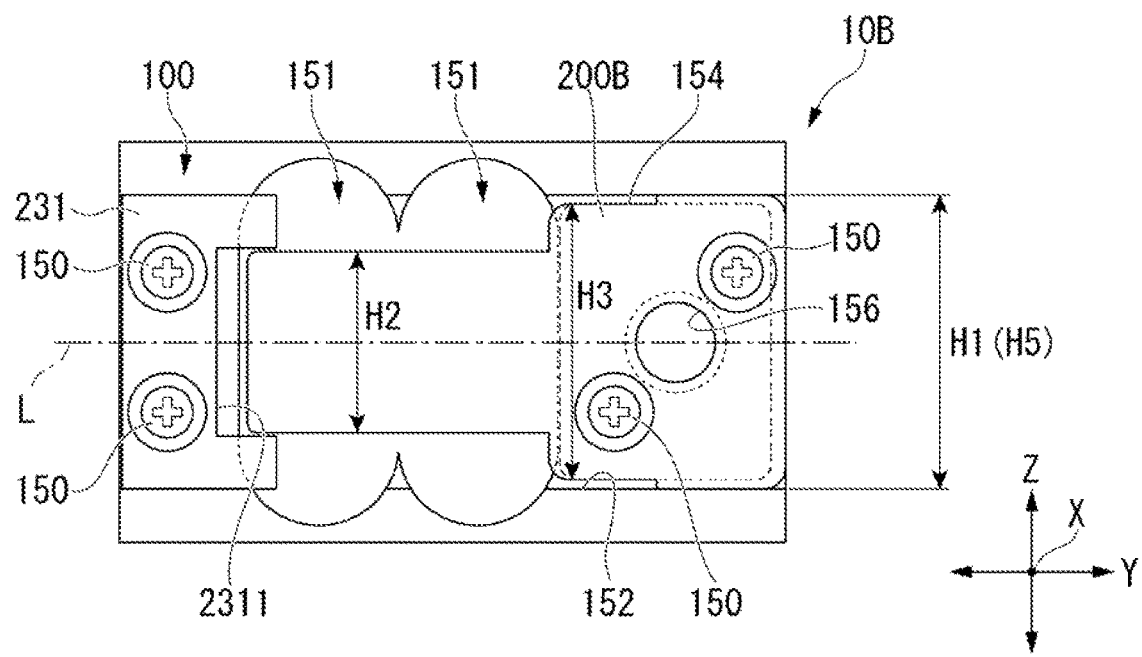
FIG. 5 is a front view showing a configuration of a load cell disclosed in a second modification example of the present embodiment.

As shown in FIG. 5, the load cell 10B according to the present modification example is different from the load cell 10 according to the above-described first embodiment in that a stopper member 200B is formed in a substantial T shape and a first position-restriction member 231 is formed at the tip end side of the columnar body 100.

The first position-restriction member 231 of the load cell 10B according to the present modification number is fixed to the tip end side of the columnar body 100 by the fixing mechanism 150. The first position-restriction member 231 has a position-restriction tank 2311 that may cover at least part of the tip-end free portion of the stopper member 200B. In other words, at least part of the tip-end free portion of the stopper member 200B of the load cell 10B is accommodated in the position-restriction tank 2311 formed in the first position-restriction member 231. Also, in this state, the tip-end free portion of the stopper member 200B and the position-restriction tank 2311 are separated by a predetermined interval in the height direction of the load cell 10B. The interval between the tip-end free portion of the stopper member 200B and the position-restriction tank 2311 is suitably determined according to the elastic deformation amount of the strain portion (penetration hole 151) corresponding to the maximum weighting of the load cell 10B.

(Effect According to Second Modification Example)

According to the load cell 10B disclosed in the present modification example, when the weighted object having the weight less than the maximum weighting is disposed on the weighting tray, the elastic deformation occurs in the strain portion (penetration hole 151) of the load cell 10B, and tip-end free portion of the stopper member 200B relatively moves with respect to the first position-restriction member 231 in the position-restriction tank 2311. In this case, since the tip-end free portion of the stopper member 200B does not contact with the internal surface of the position-restriction tank 2311, the elastic deformation of the strain portion of the load cell 10B is not restricted.

On the other hand, when the weighted object heavier than the maximum weighting is disposed on the weighting tray, the strain portion (penetration hole 151) of the load cell 10B reaches the limitation of the elastic deformation and the tip-end free portion contacts with the internal surface of the position-restriction tank 2311. In this state, the stopper member 200B and the columnar body 100 becomes the integrated configuration. Accordingly, it is possible to prevent the deformation exceeding the elastic deformation limit occurring in the strain portion of the columnar body 100. According to the load cell 10B according to the present modification, when the weighted object heavier than the maximum weighting is disposed on the weighting tray or the unintentionally impact is applied on the weighting tray, it is possible to avoid the permanent strain and the malfunctions occurring in the load cell 10B.

Figure 10:
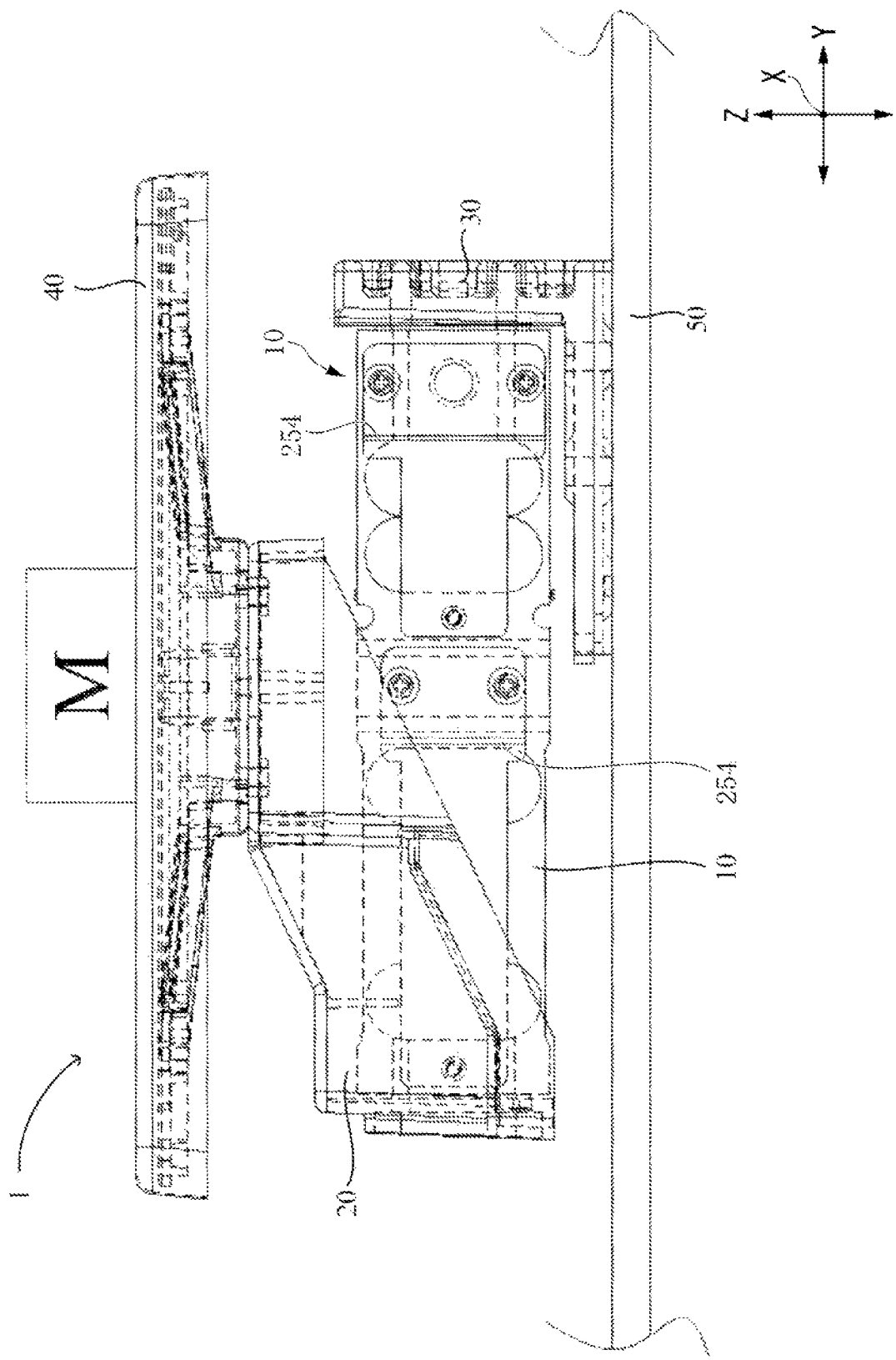
FIG. 10 is a front view showing a configuration of a load cell scale configured from the load cell according to the first modification example of the present embodiment.

The configurations of the load cells according to the first embodiment and two modification examples of the first embodiment of the present invention are described. The load cell according to the present embodiment and the modification examples only have a single strain portion. Accordingly, as shown in FIG. 10, the load cell scale 1 having the single weighting is configured by attaching the upper support member 20, the lower support member 30, the weighting tray 40, and the base plate 50 having the conventional configurations to the load cell according to the present embodiment and the modification examples. According to the load cell scale 1 according to the present embodiment and the modification examples, when the weighted object heavier than the maximum weighting is disposed on the weighting tray or the unintentionally impact is applied on the weighting tray, it is possible to avoid the permanent strain and malfunctions occurring in the load cell. Also, according to the load cell scale according to the present embodiment and the modification examples, since the stopper member is disposed at the lateral surface of the load cell, it is possible to make the load cell scale 1 to be thin. Furthermore, according to the load cell scale 1 according to the present embodiment and the modification examples, since the strain portico can be adjusted by easy operations, the assembling cost and the maintenance cost of the load cell scale 1 can be reduced.

(Second Embodiment)

Figure 6:
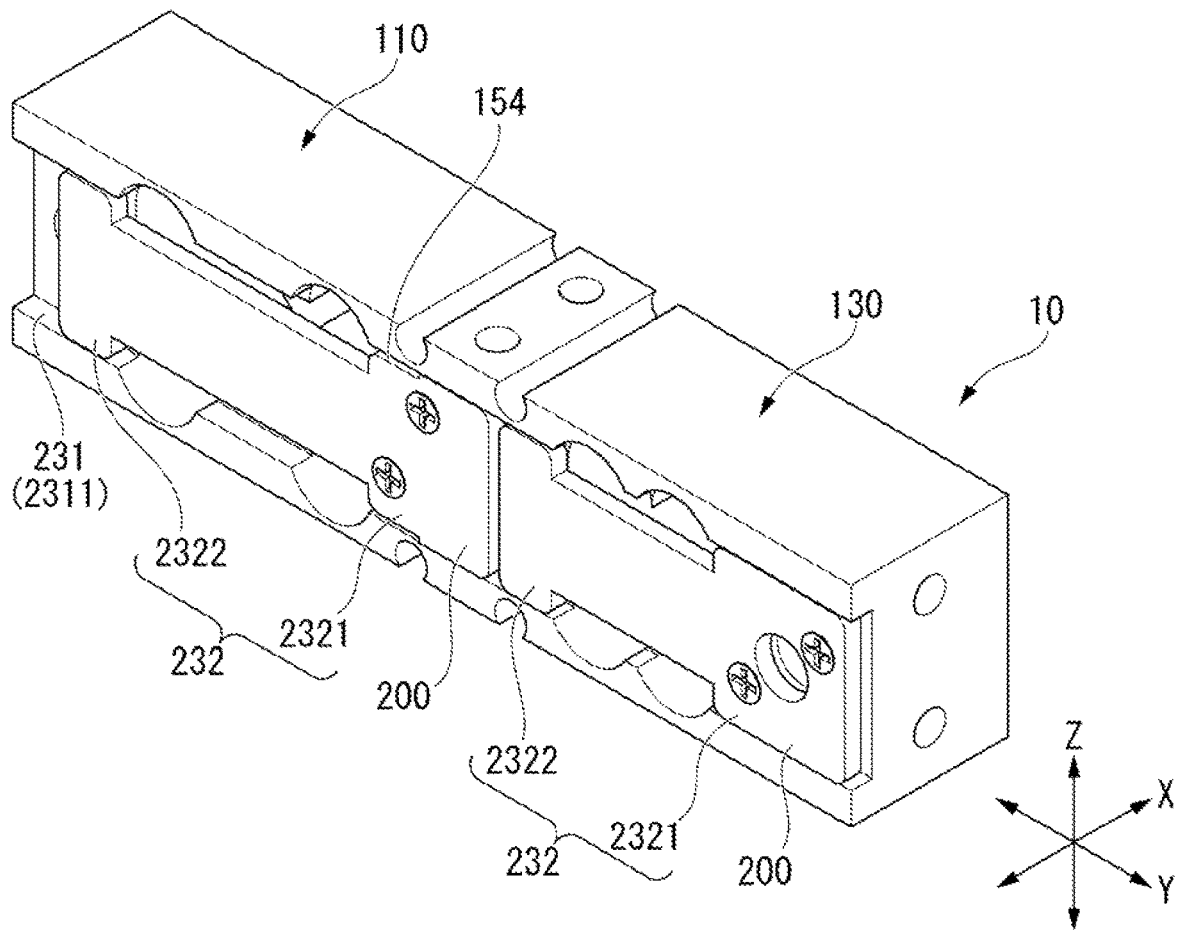
FIG. 6 is a perspective view showing a configuration of a load cell according to a second embodiment of the present invention.
Figure 7:
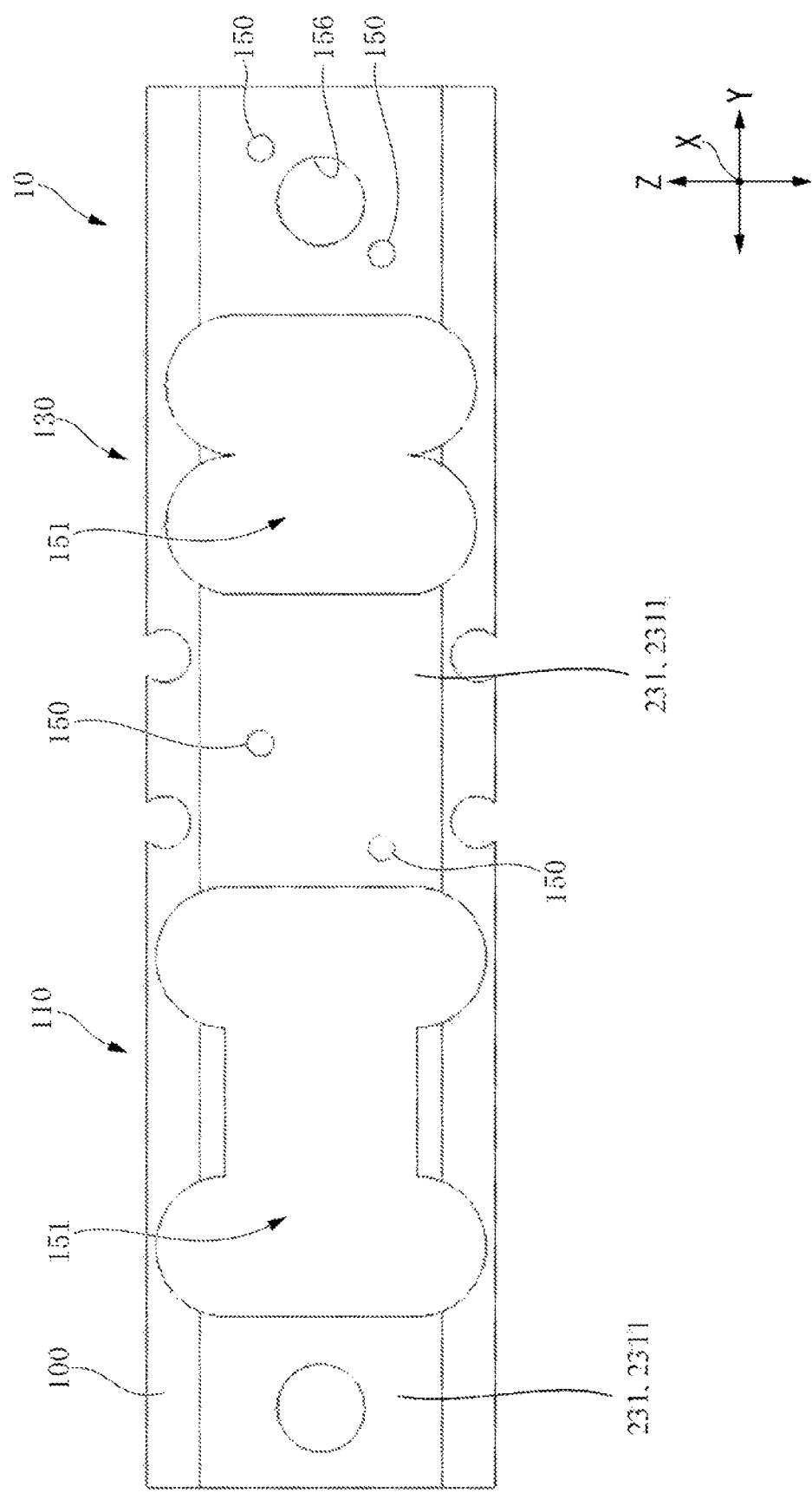
FIG. 7 is a front view showing the configuration of the load cell according to the present embodiment.
Figure 8:
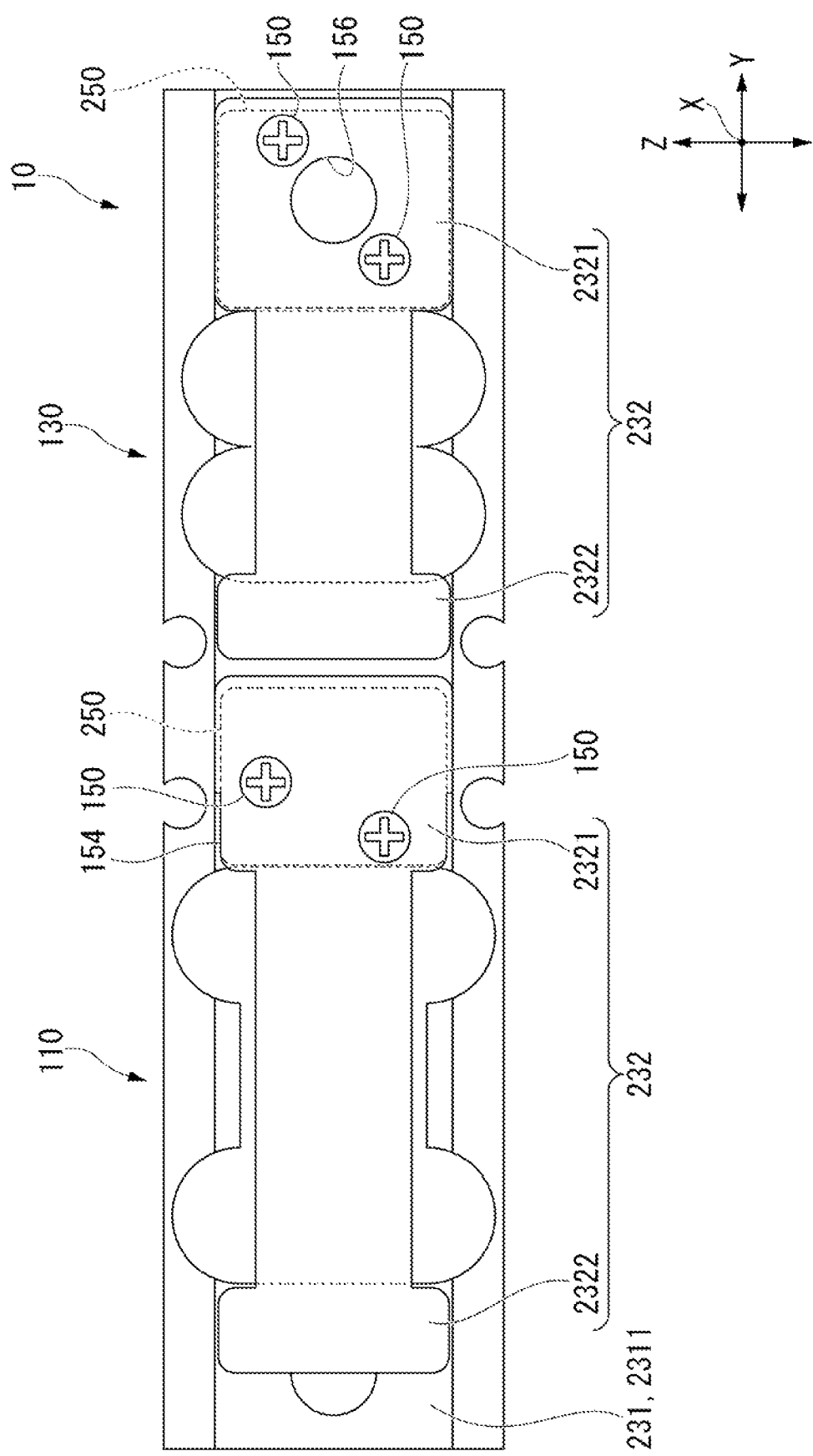
FIG. 8 is a front view showing the configuration of the load cell according to the present embodiment.

Hereinafter, the load cell 10 and the load cell scale 1 having the load cell 10 according to a second embodiment of the present invention will be described with reference to FIGS. 6-9. The load cell 10 according to the present embodiment has a tip-end load cell unit 110 and a base-end load cell unit 130 which are integrated in the direction of the longitudinal axis. More specifically, as shown in FIG. 8, in the direction of the longitudinal axis, the load cell unit 10 according to the present embodiment is configured to have a base-end fixing portion 2321 of the tip-end load cell unit 110 and a tip-end free portion 2322 of the base-end load cell unit 130 to be adjacent with each other. Accordingly, the tip end portion of the tip-end load cell unit 110 is the tip end portion of the whole load cell 10, and the base end portion of the base-end load cell unit 130 is the base end portion of the whole load cell 10.

According to the present embodiment, the tip-end load cell unit 110 and the base-end load cell unit 130 have the substantially same configurations with the load cell 10 according to the above-described first embodiment. More specifically, each of the tip-end load cell unit 110 and the base-end load cell unit 130 is configured to have the stopper member 200 including the base-end fixing portion 2321 and the tip-end free portion 2322. As shown in FIGS. 6 and 7, groove portions 2311 configured to restrict the movement of the tip-end free portions 2322 of the tip-end load cell unit 110 and the base-end load cell unit 130 are formed in the lateral surface of the columnar body 100 of the load cell 10 according to the present embodiment. According to the present embodiment, the stopper member 200 having the base-end fixing portion 2321 and the tip-end free portion 2322 is defined as a second position-restriction member 2322, and the groove portion 2311 is defined as the first position-restriction member 231.

In order to make the description to be easy, according to the present embodiment, the example in which the tip-end load cell unit 110 and the base-end load cell unit 130 have the same configurations will be described, however, the present embodiment is not limited thereto. For example, the tip-end load cell unit 110 and the base-end load cell unit 130 may have different configurations. More specifically, for example, the tip-end load cell unit 110 and the base-end load cell unit 130 may be configured to suitably combine the configurations disclosed in the above-described first embodiments and the modification examples or adopt other conventional configurations.

As shown in FIGS. 6-8, according to the present embodiment, the penetration hole 151 as the strain portion is formed in each of the tip-end load cell unit 110 and the base-end load cell unit 130 of the load cell 10. As shown in FIG. 7, the width of the penetration hole 151 of the tip-end load cell unit 110 in the direction of the longitudinal axis is larger than the width of the penetration hole 151 of the base-end load cell unit 130. Accordingly, in the load cell 10, the maximum weighting M1 of the tip-end load cell unit 110 is smaller than the maximum weighting M2 of the base-end load cell unit 130. The maximum weighting of the whole load cell 10 is equal to the maximum weighting M2 of the base-end load cell unit 130. In the load cell 10, the tip-end load cell unit 110 may have a higher weighting accuracy than that of the base-end load cell unit 130.

Accordingly, it is possible to configure a load cell scale having a maximum weighting larger than that of the load cell 10 according to the above-described first embodiment by adopting the load cell 10 according to the present embodiment. Furthermore, according to the load cell 10 disclosed in the present embodiment, as described below, in a case of weighting the weighted object lighter than the maximum weighting M1 of the tip-end load cell unit 110, the tip-end load cell unit 110 having a relatively higher accuracy is used such that a weighting result with higher accuracy may be achieved.

Figure 9:
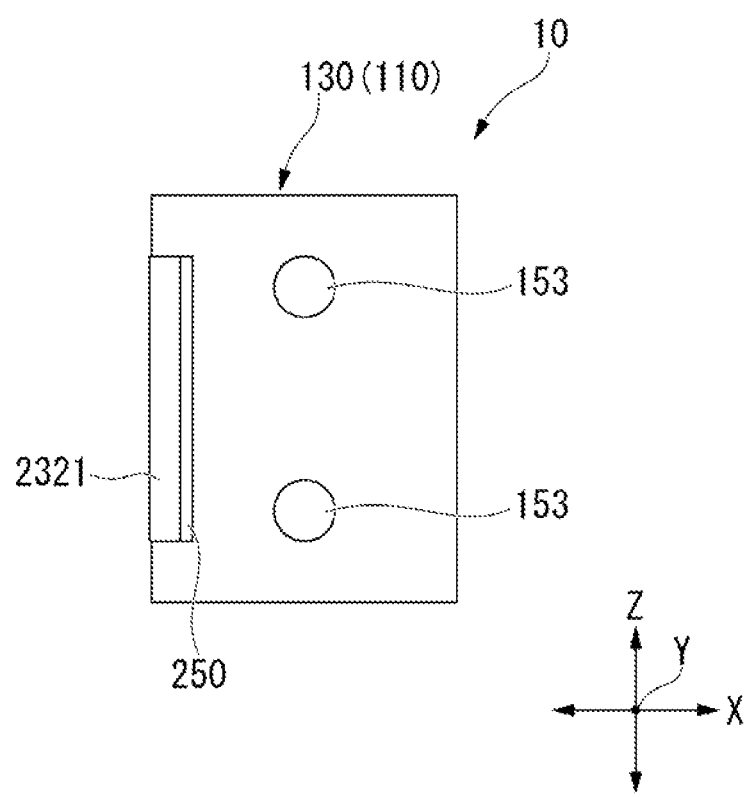
FIG. 9 is a side view showing the configuration of the load cell according to the present embodiment.

As shown in FIGS. 8 and 9, in the load cell 10 according to the present embodiment, the intermediate member 250 is provided between the base-end fixing portion 2321 and the groove portion 2311 of each of the base-end load cell unit 130 and the tip-end load cell unit 110. Accordingly, similar to the load cell according to the above-described first embodiment and the modification examples, the accuracy of the weighting results of the weighted object may be improved by preventing the stopper member 200 and the columnar body 100 from unintentionally contacting with each other. As shown in FIG. 9, according to the present embodiment, the groove portion 2311 in the columnar body 100 of the load cell 10 may be formed to have a depth substantially same with the sum of the thicknesses of the stopper member 200 and the intermediate member 250 in the short direction; however, the present embodiment is not limited thereto.

For example, as shown in FIG. 10, in the load cell 10 of the load cell scale 1 according to the present embodiment, the intermediate member 250 may not be provided between the stopper member 200 and the columnar body 100, and the stopper member 200 may have the step portion 254.

As shown in FIG. 8, the tip-end load cell unit 110 of the load cell 10 has a step portion 254 having the width H3 in the Z-axis direction and formed at the tip end side of the base-end fixing portion 2321, similar to the step portion 154 formed in the stopper member 200 of the load cell 10 according to the above-described first embodiment. Accordingly, according to the load cell 10 disclosed in the present embodiment, similar to the load cell 10 according to the above-described embodiment 1, it is possible to realize both of the goals of correctly recognizing the deformation amount of the strain portion occurring in the tip-end load cell unit 110 and retaining the rigidity of the tip-end load cell unit 110.

According to the present embodiment, in the load cell 10, the tip-end load cell unit 110 and the base-end load cell unit 130 are integrated configured along the direction of the longitudinal axis. Accordingly, comparing with a case in which two load cell units are connected to configure a load cell, the load cell 10 according to the present embodiment can eliminate the assembly tolerances and the like during the procedures of connecting several load cell units so as to configure the load cell 10 with a higher assembly precision. Also, since it is not necessary to use a connection member for connecting the several load cell units, it is possible to reduce components, shorten the assembly procedures such that the load cell 10 can be manufactured at a lower cost.

Other configurations of the load cell 10 according to the present embodiment are the same with that of the load cell 10 according to the above-described first embodiment, therefore the description will be omitted. The load cell scale 1 (see FIG. 10) according to the present embodiment can be configured by attaching the above-described lower support member 30, the base plate 50, the upper support member 20, and the weighting tray 40 to the load cell 10 according to the present embodiment.

(Operations According to Second Embodiment)

Hereinafter, operations of the load cell 10 and the load cell scale 1 having the above-described configurations will be described. More specifically, the operations of the load cell 10 according to the present embodiment will be described according to the relation of the weight M of the weighted object, the maximum weighting M1 of the tip-end load cell unit 110 of the load cell 10, and the maximum weighting M2 of the base-end cell unit 130. As described above, in the load cell unit 10 according to the present embodiment, the maximum weighting M1 of the tip-end load cell unit 110 is smaller than the maximum weighting M2 of the base-end load cell unit 130.

Firstly, a case in which the weight M of the weighted object is less than the maximum weighting M1 of the tip-end load cell unit 110 will be described. In this case, when the weighted object is disposed on the weighting tray of the load cell scale 1 having the load cell 10, the weight M of the weighted object applies on the load cell 10 as the load. Since the weight M of the weighted object is less than the maximum weighting M1 of the tip-end load cell unit 110, the elastic deformation occurs in the penetration hole 151 as the strain portion of the tip-end load cell unit 110, however there is almost no elastic deformation occurring in the strain portion of the base-end load cell unit 130. In other words, in this state, in the tip-end load cell unit 110, the tip-end free portion 2322 of the stopper member 200 is in the groove portion 2311 and moves with respect to the internal surface of the groove portion 2311; however the tip-end free portion 2322 does not contact with the internal surface of the groove portion 2311.

When the weighted object having the weight equal to the maximum weighting M1 of the tip-end load cell unit 110 is disposed on the weighting tray of the load cell scale 1, due to the deformation of the penetration hole 151 as the strain portion, the tip-end free portion 2322 of the stopper member 200 contacts with the internal surface of the groove portion 1311. In other words, in this state, the stopper member 200 (second position-restriction member 232) and the groove portion 2311 (first position-restriction member 231) of the tip-end load cell unit 110 contact and engage with each other such that the tip-end load cell unit 110 and the columnar body 100 become the integrated configuration. In this state, the strain portion of the tip-end load cell unit 110 almost reaches the limit of the elastic deformation, however there is almost no elastic deformation occurring in the strain portion of the base-end load cell unit 130.

Hereinafter, a case in which the weighted object having a weight larger than the maximum weighting M1 of the tip-end load cell unit 110 and less than the maximum weighting M2 of the base-end load cell unit 130 is disposed on the weighting tray of the load cell scale 1 will be described. In this case, as described above, the stopper member 200 of the tip-end load cell unit 110 and the columnar body 100 has become the integrated configuration such that the strain portion of the tip-end load cell unit 110 retains the maximum elastic deformation amount and no further deformation occurs therein. Accordingly, in the tip-end load cell unit 110, it is possible to prevent the penetration 151 as the strain portion from further deforming exceeding the limit of the elastic deformation.

At this time, the weight M of the weighted object applies to the base-end load cell unit 130 as the load and the elastic deformation occurs in the penetration hole 151 as the strain portion in the base-end load cell unit 130. Also, in this case, the tip-end cell unit 110 may be recognized as part of the base-end cell unit 130. Similar to the case described above, it is possible to measure the weight M of the weighted object by detecting the signals indicating the elastic deformation amount of the penetration hole 151 as the strain portion of the base-end load cell unit 130.

In a case in which the weighted object having the weight M equal to or larger than the maximum weighting M2 of the base-end load cell unit 130 is disposed on the load cell scale 1, both of the tip-end load cell unit 110 and the base-end load cell unit 130 are in the state where the elastic deformation occurring therein reaches the limit amount. In this state, the stopper member 200 (second position-restricting member 232) and the groove portion 2311 (first position-restricting member 231) of the tip-end load cell unit 110 and the base-end load cell unit 130 contact and engage with each other such that the tip-end load cell unit 110, the base-end load cell unit 130, and the columnar body 100 become the integrated configuration. Accordingly, according to the load cell 10 disclosed in the present embodiment, it is possible to prevent the deformation exceeding the limit of the elastic deformation and the malfunctions in the tip-end load cell unit 110 and the base-end load cell unit 130.

(Effect According to Second Embodiment)

According to the load cell 10 disclosed in the present embodiment, the tip-end load cell unit 110 and the base-end load cell unit 130 have almost the same configurations with that of the load cell 10 according to the above-described first embodiment such that the same effect is achieved with the load cell 10 according to the above-described first embodiment. More specifically, even if the weighted object having the weight M larger that the maximum weighting M1 of the tip-end load cell unit 110 or the maximum weighting M2 of the base-end load cell unit 130 is disposed on the weighting tray 40 of the load cell scale 1, there is no elastic deformation exceeding the limit occurring in the tip-end load cell unit 110 and the base-end load cell unit 130. Accordingly, it is possible to avoid unrecoverable deformation occurring in the load cell 10 having the tip end load cell unit 110 and the base-end load cell unit 130.

According to the load cell 10 disclosed in the present embodiment, since the accuracy and the maximum weighting of the tip-end load cell unit 110 and the base-end load cell unit 130 are different, it is possible to measure the weighted objects having different weight M by using different maximum weightings and measurement accuracies. Furthermore, according to the load cell 10 disclosed in the present embodiment, the tip-end load cell unit 110 and the load cell unit 130 are integrated configured such that it is possible to improve the assembly precision and reduce the manufacturing cost and the maintenance cost of the load cell 10.

(First Modification Example of Second Embodiment)

Figure 11:
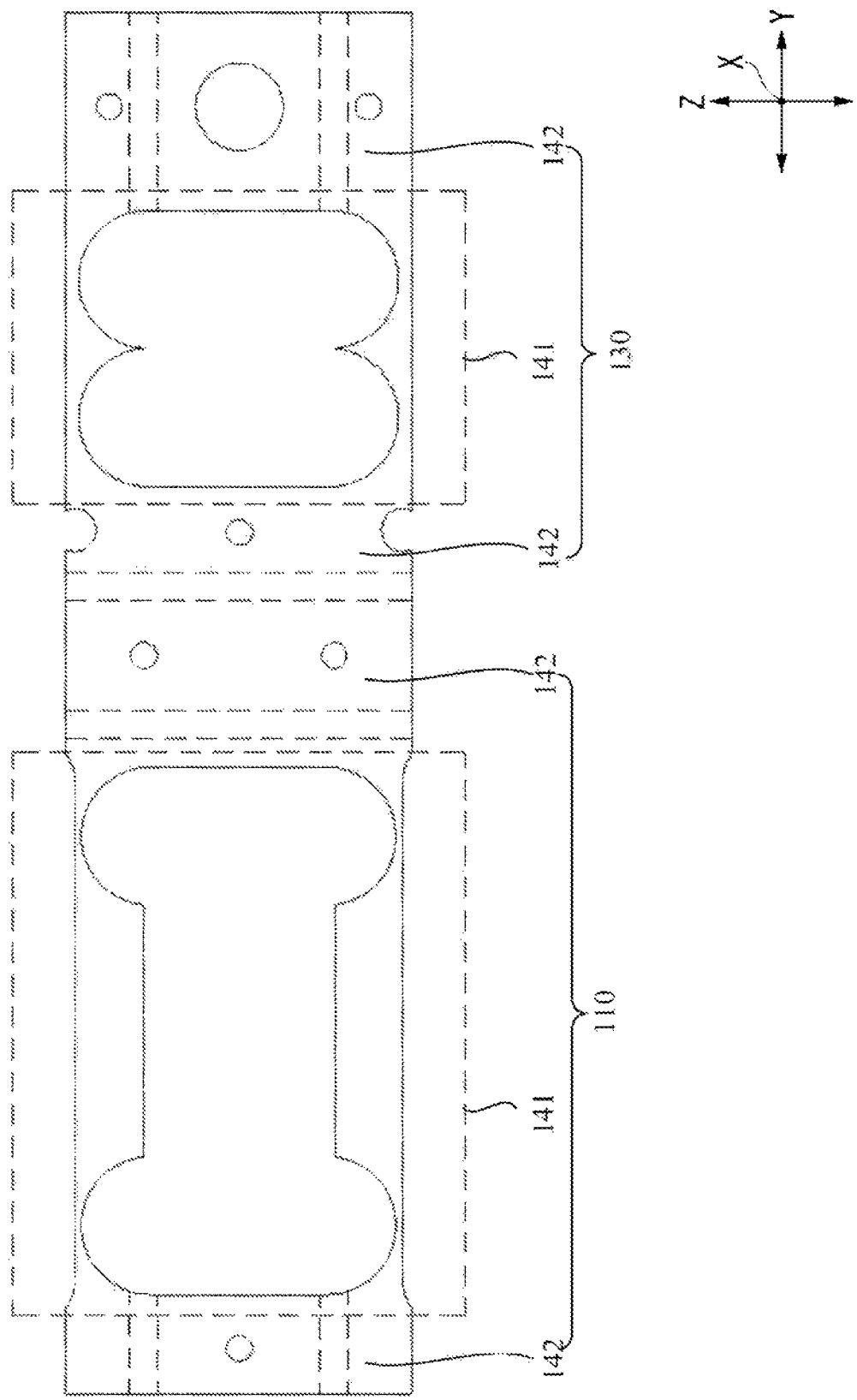
FIG. 11 is a front view showing the configuration of the load cell according to the present modification example.
Figure 12:
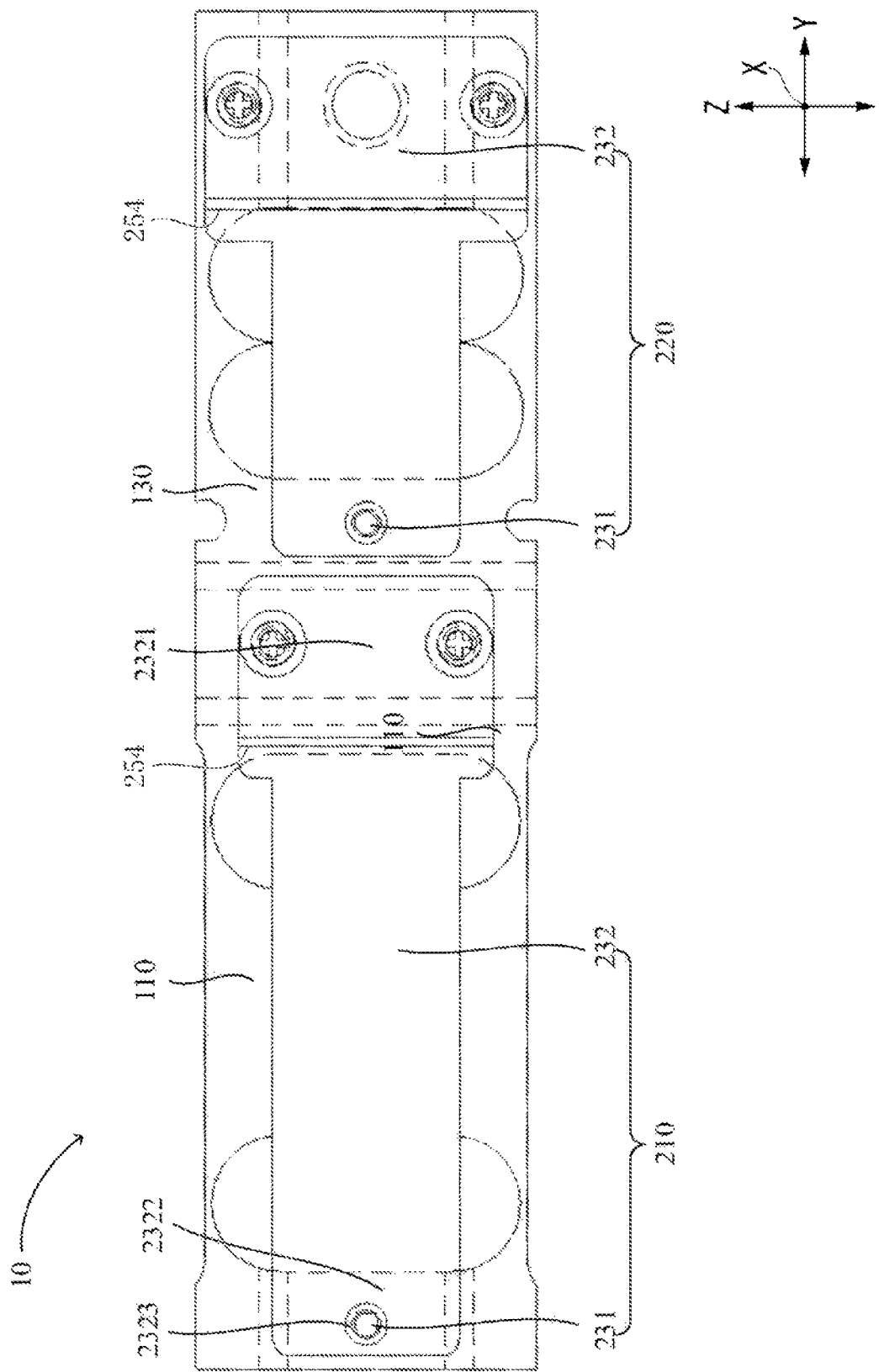
FIG. 12 is a front view showing an operation of the load cell according to the present modification example.
Figure 14:
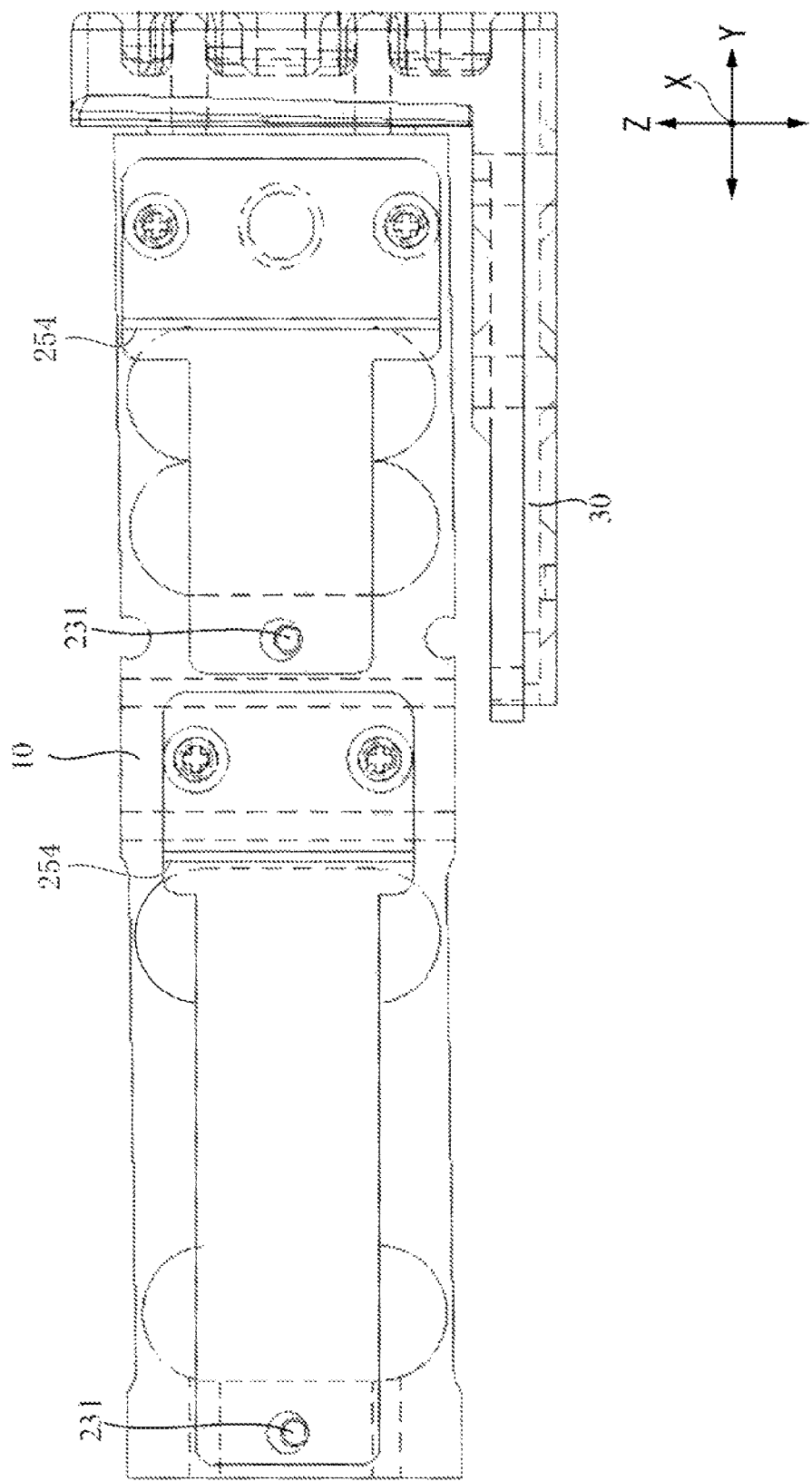
FIG. 14 is a front view showing the operation of the load cell according to the present modification example.

Hereinafter, a first modification of the present embodiment will be described with reference to FIG. 10 to FIG. 14. FIG. 10 is a front view showing a configuration of a load cell scale 1 having the load cell 10 according to the present modification example. FIG. 11 is a front view showing the configuration of the load cell 10 according to the present modification example. FIGS. 12-14 are figures showing the operations of the load cell 10 according to the present modification example.

As shown in FIG. 10, the load cell scale 1 according to the present modification example has the load cell 10, the upper support member 20, the lower support member 30, the weighting tray 40, and the base plate 50. In the present modification example, the upper support member 20 is connected to the weighting tray 40 and the tip end of the load cell 10, and the lower support member 40 is connected to the base end of the load cell 10 and the base plate 50. In other words, in the present modification example, the tip end of the load cell 10 is connected to the upper support member 20 to receive the force from the weighting tray 40. The base end of the load cell 10 and the lower support member 30 are connected with each other and then fixed to the base plate 50. FIG. 10 shows that the weighted object having the weight M is disposed on the weighting tray 40 of the load cell scale 1.

As shown in FIGS. 10-12, similar to the load cell 10 according to the above-described second embodiment, the load cell 10 according to the present modification example has the configuration that the tip-end load cell unit 110 and the base-end load cell unit 130 are integrated in the direction of the longitudinal axis. As shown in FIG. 11, each of the tip-end load cell unit 110 and the base-end load cell unit 130 has a first region 141 and a second region 142. In the tip-end load cell unit 110 and the base-end load cell unit 130, two second regions 142 are positioned at two sides of the first region 141. As shown in FIG. 11, the regions 141 of the tip-end load cell unit 110 and the base-end load cell unit 130 are designated as deformation regions and the regions 141 are shown by being surrounded by broken lines. In other words, in each of the tip-end load cell unit 110 and the base-end load cell unit 130, the first region 141 is formed between the second region 142 at the tip end side and the second region 142 at the base end side.

As shown in FIGS. 11 and 12, the tip-end load cell unit 110 and the base-end load cell unit 130 of the load cell 10 according to the present modification example have the same configurations with that of the load cell 10A according to the above-described first modification example of the first embodiment. In other words, the load cell 10 according to the present modification example has the configuration of using two load cells 10A according to the above-described first modification example of the first embodiment to achieve the integrated configuration in the direction of the longitudinal axis.

Similar to the load cell 10A according to the above-described first modification example of the first embodiment, each of the tip-end load cell unit 110 and the base-end load cell unit 130 of the load cell 10 according to the present modification example has the stopper member 232 (second position-restriction member) formed in the T shape and the protrusion 231 (first position-restriction member) formed at the tip end side of the columnar body 100 of the load cell 10. More specifically, for example, as shown in FIG. 12, in the tip-end load cell unit 110, the protrusion 231 and the tip-end free portion 2322 of the stopper member 232 are disposed in the second region 142 at the tip end side, and the base-end fixing portion 2321 of the stopper member 232 is fixed in the second region 142 at the base end side. Accordingly, the stopper member 232 is formed to be across the first region 141 of the tip-end lad cell unit 110. In the present modification example, a combination of the protrusion (first position-restriction member) 231 formed in the columnar body 100 and the stopper member (second position-restriction member) 232 is defined as a position-restriction mechanism 210.

Similar to the tip-end load cell unit 110, the base-end load cell unit 130 has the position-restriction mechanism 210 configured from the protrusion (first position-restriction member) 231 formed in the columnar body 100 and the stopper member (second position-restriction member) 232. In the present modification example, the position-restriction mechanism is configured to protect the first region 141 as the deformation region in the base-end load cell unit 130 and the tip-end load cell unit 110.

More specifically, for example, in the tip-end load cell unit 110 of the load cell 10 according to the present modification example, a penetration hole 2322 having an internal diameter larger than the diameter of the protrusion 231 is formed in the tip-end free portion 2322 of the stopper member 232. In the case in which the weighted object is not disposed on the weighting tray 40 of the load cell scale 1, the elastic deformation does not occur in the tip-end load cell unit 110, and the protrusion 231 is freely movable in the penetration hole 232 and accommodated therein. The load cell 10 according to the present modification example has the configuration such that an alignment of the protrusion (first position-restriction member) 231 formed in the columnar body 100 and the stopper member (second position-restriction member) 232 may be performed with a better accuracy.

On the other hand, the base-end load cell unit 130 of the load cell 10 according to the present modification example has the same configuration with the above-described tip-end load cell unit 110 and the description will be omitted.

As shown in FIG. 12, in the present modification example, the stopper member 232 is formed in the substantially T shape, and the stopper member 232 is a plate-shaped member formed from the metal material having a suitable rigidity such as the iron and the like. However, the configuration of the stopper member 232 is not limited thereto. For example, the stopper member 232 may be suitably formed in a shape besides the T shape.

As shown in FIG. 12, the stopper member 232 according to the present modification example is formed to have the step portion 254, however, the configuration at the stopper member 232 is not limited thereto. Similar to the above-described embodiments and corresponding modification examples, the load cell 10 may be configured to have the intermediate portion 250 that is sandwiched by the stopper member 232 and the columnar body 100.

In the load cell 10 according to the present modification example, the maximum weighting M1 increase to the maximum weighting M2 in the sequence from the tip-end load cell unit 110 to the base-end load cell unit 130. In the load cell 10 according to the present modification example, the resolution (measurement accuracy) of the tip-end load cell unit 110 and the base-end load cell unit 130 may be different.

Next, operations of the load cell 10 according to the present modification example will be described with reference to FIGS. 12-14. More specifically, the operations of the load cell 10 according to the present modification example will be described according to the relationship of the weight M of the weighted object, the maximum weighting M1 of the tip-end load cell unit 110 of the load cell 10, and the maximum weighting M2 of the base-end load cell unit 130 of the load cell 10.

As shown in FIG. 12, in the state in which there is no weighted object disposed on the weighting tray 40 of the load cell scale 1, in the tip-end load cell unit 110 and the base-end load cell unit 130, each protrusion (first position-restriction member) 231 is positioned in the corresponding penetration hole 2323 and the protrusion 231 does not contact with the internal surface of the corresponding penetration hole 2323. In other words, in this state, the protrusion 231 is freely movable in the corresponding penetration hole 2323.

Next, a case in which the weight M of the weighted object is less than the maximum weighting M1 of the tip-end load cell unit 110 of the load cell 10 will be described. As shown in FIG. 10, when the weighted object is disposed on the weighting tray 40 of the load cell scale 1 having the load cell 10, the weight M of the weighted object applies on the load cell 10 as the load. Since the weight M of the weighted object is less than the maximum weighting M1 of the tip-end load cell unit 110, the elastic deformation occurs in the penetration hole 151 (first region 141) as the strain portion of the tip-end load cell unit 110, however there is almost no elastic deformation occurring in the first region of the base-end load cell unit 130. In this state, the elastic deformation occurs in the first region 141 of the tip-end load cell unit 110 such that the protrusion 231 moves in the penetration hole 2323, however, the protrusion 231 does not contact with the internal surface of the penetration hole 2323.

When the weighted object having the weight equal to the maximum weighting M1 of the tip-end load cell unit 110 is disposed on the weighting tray of the load cell scale 1, the first region 141 of the tip-end load cell unit 110 is deformed to reach the limit of the elastic deformation such that the protrusion 231 contacts with the internal surface of the penetration hole 2323. In other words, in this state, the protrusion (first position-restriction member) 231 of the tip-end load cell unit 110 contacts and engages with the internal surface of the penetration hole 2323 such that the stopper member (second position-restriction member) 232 and the columnar body 100 in the tip-end load cell unit 110 become the integrated configuration. In this state, the first region 141 of the tip-end load cell unit 110 almost reaches the limit of the elastic deformation; however, there is almost no elastic deformation occurring in the first region 141 of the base-end load cell unit 130.

Next, a case in which the weighted object having the weight M larger than the maximum weighting M1 of the tip-end load cell unit 110 and less than the maximum weighting M2 of the base-end load cell unit 130 is disposed on the weighting tray of the load cell 1 will be described. In this case, as shown in FIG. 13, the stopper member 232 of the tip-end load cell unit 110 and the columnar body 100 have become the integrated configuration, therefore the state in which the first region 141 of the tip-end load cell unit 110 is deformed to reach the limit of the elastic deformation is retained and no further deformation occurring in the first region 141. At this time, in the tip-end load cell unit 110, it is possible to prevent the further deformation exceeding the limit of the elastic deformation occurring in the first region 141 so as to avoid the malfunctions in the tip-end load cell unit 110.

On the other hand, the weight M of the weighted object applies to the base-end load cell unit 130 as the load and the elastic deformation occurs in the first region 141 as the strain portion in the base-end load cell unit 130. In this case, the tip-end cell unit 110 may be recognized as part of the base-end cell unit 130. At this time, due to the elastic deformation occurring in the first region 141 as the strain portion in the base-end load cell unit 130, in the base-end load cell unit 130, the protrusion 231 moves in the penetration hole 2323 in response to the elastic deformation amount of the first region 141. However, in this case, the protrusion 231 does not contact with the internal circumferential surface of the penetration hole 2323.

According to the load scale 1 disclosed in the present modification example, it is possible to measure the weight M of the weighted object by detecting the electrical signals indicating the elastic deformation amount of the first region 141 of the base-end load cell unit 130.

In a case in which the weighted object having the weight M larger than the maximum weighting M2 of the base-end load cell unit 130, both of the tip-end load cell unit 110 and the base-end load cell unit 130 enter the state in which the tip-end load cell unit 110 and the base-end load cell unit 130 are deformed to reach the limit of elastic deformation. As shown in FIG. 14, in this state, in each of the tip-end load cell unit 110 and the base-end load cell unit 130, the protrusion 231 contacts and engages with the internal circumferential surface of the corresponding penetration hole 2323. In other words, at this time, the stopper member 232 and the columnar body 100 in the tip-end load cell unit 110 and the base-and load cell unit 130 become the integrated configuration. Accordingly, in the load cell 10 according to the present modification example, it is possible to prevent the tip-end load cell unit 110 and the base-end load cell unit 130 from deforming exceeding the limit of the elastic deformation.

According to the load cell 10 and the load cell scale 1 having the load cell 10 disclosed in the present modification example, the configuration of the position-restriction mechanism 210 configured from the protrusion (first position-restriction member) 231 and the stopper member (second position-restriction member) 232 is different from that according to the above-described second embodiment, however, the same effect with the above-described second embodiment may be achieved.

(Second Modification Example of Second Embodiment)

Figure 15:
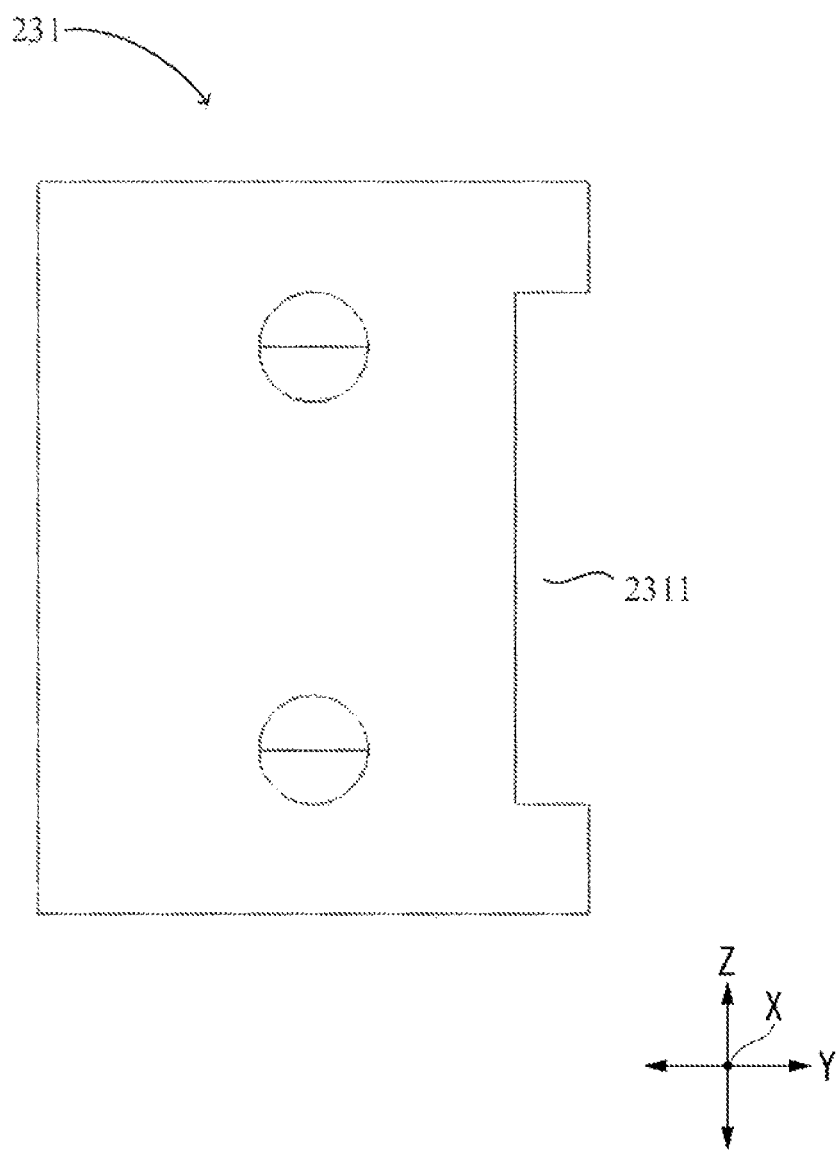
FIG. 15 is a front view showing a configuration of a position-restriction member of the load cell according to the second modification example of the present embodiment.
Figure 16:
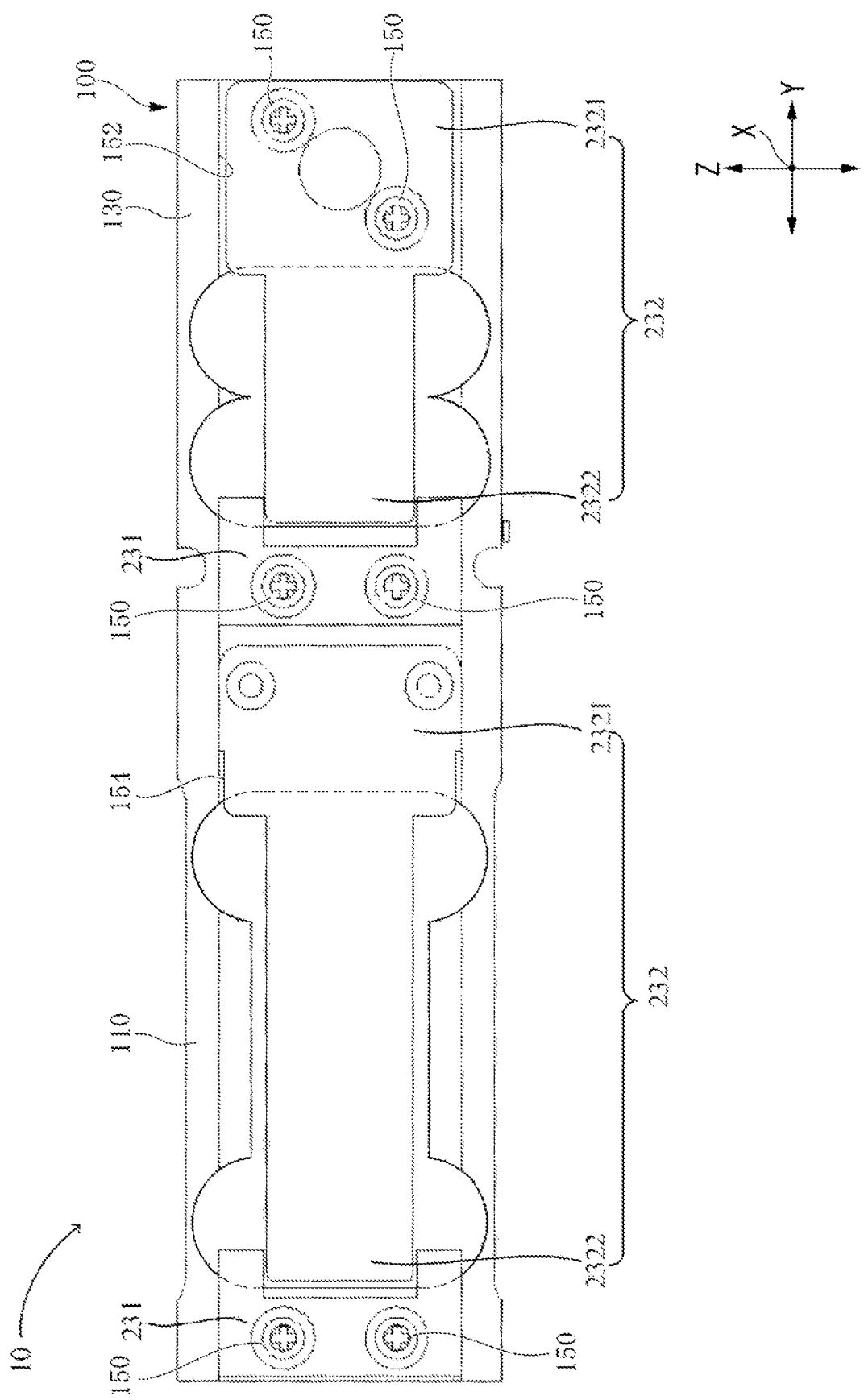
FIG. 16 is a front view showing the configuration of the load cell according to the present modification example.

Hereinafter, the load cell 10 according to the second modification example of the present embodiment will be described with reference to FIGS. 15 and 16. As shown in FIG. 16, the load cell according to the present modification example has the configuration that the tip-end load cell unit 110 and the base-end load cell unit 130 is integrated in the direction of the longitudinal axis. Also, the tip-end load cell unit 110 and the base-end load cell unit 130 have the same configuration as that of the load cell 10B according to the above-described second modification example of the first embodiment.

More specifically, the tip-end load cell unit 110 and the base-end load cell unit 130 according to the present modification example are configured to have position-restriction tank (first position-restriction member) 231 (see FIG. 15) connected and fixed to the columnar body 100 and the stopper member (second position-restriction member) 232 former in the substantial T shape. As shown in FIG. 16, in the tip-end load cell unit 110 and the base-end load cell unit 130, the base-end fixing portion 2321 of the stopper member 232 and the position-restriction tank 231 are connected and fixed to the columnar body 100 of the load cell 10 by the fixing mechanism 150. At least part of the tip-end free portion 2322 of the stopper member 232 is covered by the corresponding position-restriction tank 231 in the direction of the longitudinal axis. In other words, at least part of the tip-end free portion 2322 of the stopper member 232 is accommodated in the position-restriction tank 231.

As shown in FIG. 16, in the height direction of the load cell 10 according to the present modification example, the tip-end free portion 2322 of the stopper member 232 and the position-restriction tank 231 are separated by a predetermined interval. The interval between the tip-end free portion of the stopper member 232 and the position-restriction tank 231 is suitably determined according to the maximum elastic deformation amount of the strain portion corresponding to the maximum weighting M1 of the tip-end load cell unit 110 and the maximum weighting M2 of the base-end load cell unit 130. In the present modification example, the maximum weighting M1 of the tip-end load cell unit 110 may be less than the maximum weighting M2 of the base end load cell unit 130.

As shown in FIG. 16, in the base-end fixing portion 2321 of the tip-end load cell unit 110 of the iced cell 10 according to the present modification example, the step portion 154 having the width H3 in the height direction may be provided. The load cell 10 according to the present modification example has the step portion 154 so as to prevent the base-end fixing portion 2321 of the stopper member 232 from unintentionally contacting with the internal surface of the groove portion 152. Accordingly, when the weighted object is disposed on the load cell 10, the deformation amount of the columnar body 100 can be correctly recognized. The step portion 154 is formed in only part of the base-end fixing portion 2321 the stopper member 232 such that it is possible to retain the rigidity of the tip-end load cell unit 110.

As shown in FIG. 16, the example that the base-end fixing portion 2321 of the base-end load cell unit 130 is separated from the internal surface of the groove portion 152 for an interval is described, however, the present modification example is not limited thereto. For example, similar to the tip-end load cell unit 110, the base-end load cell unit 130 may have the base-end fixing unit 2321 where the step portion 154 formed therein.

In the tip-end load cell unit 110 and the base-end load cell unit 130 of the load cell 10 according to the present modification example, a combination of the position-restriction tank (first position-restriction member) 231 and the stopper member (second position-restriction member) 232 is defined as the position-restriction mechanism 210. Accordingly, according to the load cell 10 disclosed in the present modification example, similar to the above-described embodiments and modification examples, the movement range of the stopper member 232 is restricted by the position-restriction tank 231 such that it is possible to prevent the tip-end load cell unit 110 and the base-end load cell unit 130 from deforming to exceed the limit of the elastic deformation so as to avoid the malfunctions.

More specifically, for example, in the load cell scale 1 having the load cell 10 according to the present modification example, in the case of weighting the weighted object having the weight M that is larger than the maximum weighting M1 of the tip-end cell unit 110 and less than the maximum weighting M2 of the base-end load cell unit 130, the stopper member 232 engages with the internal surface of the position-restriction tank 231 of the tip-end load cell unit 110 to be in the integrated state, and the weight M of the weighted object applies on the base-end load cell unit 130 as the load. At this time, the tip-end free portion 2322 of the stopper member 232 of the base-end load cell unit 130 moves in the corresponding position-restriction tank 231, however, the tip-end free portion 2322 does not contact with the internal surface of the position-restriction tank 231. In this state, the weight M of the weighted object is measured by detecting the signals indicating the elastic deformation amount in the strain portion of the base-end load cell unit 130.

According to the load cell 10 and the load cell scale 1 having the load cell 10 according to the present modification example, the same effect with that of the load cells and the load cell scales according to the above-described various embodiments and modification examples is achieved.

(Third Modification Example of Second Embodiment)

Figure 17:
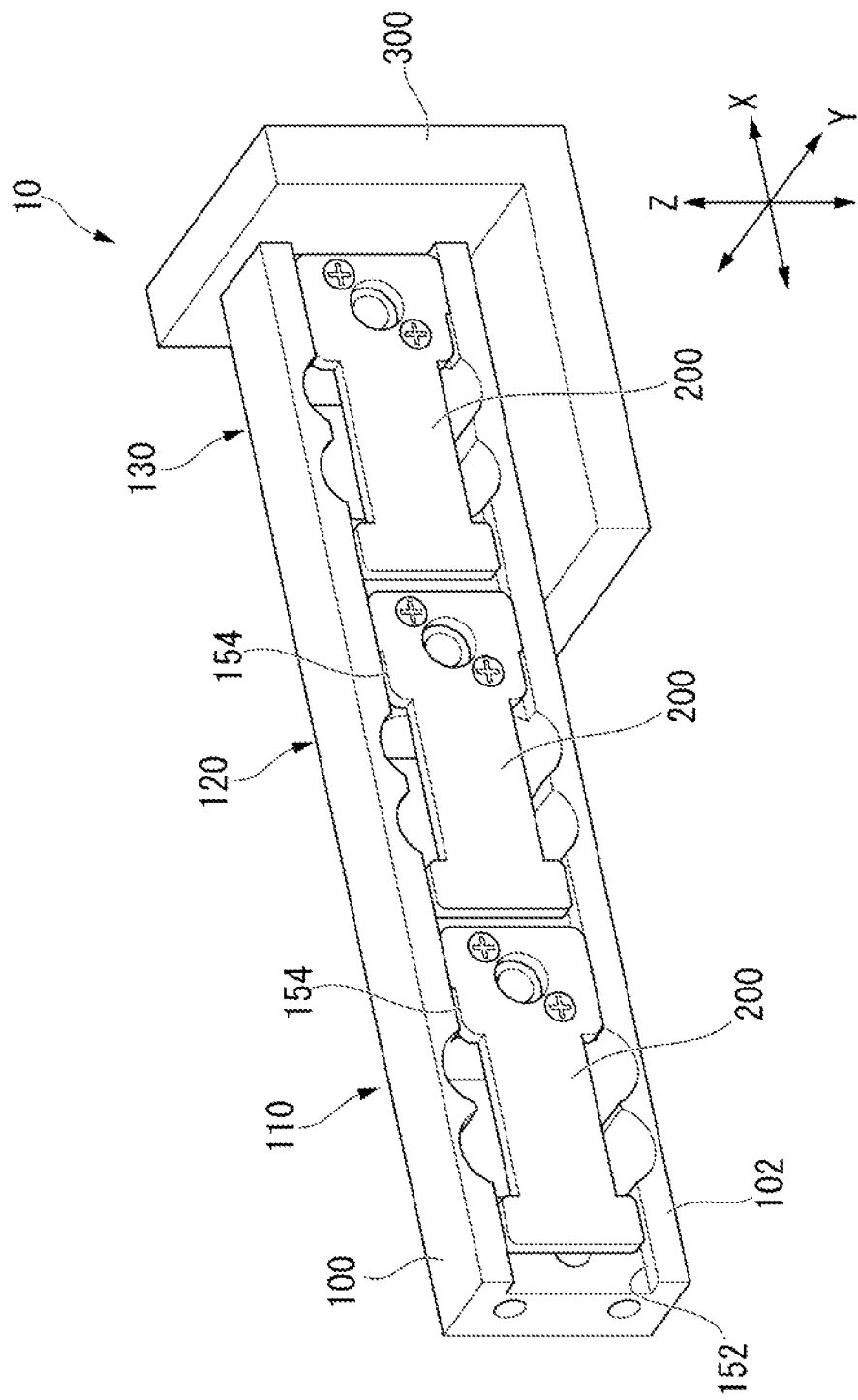
FIG. 17 is a perspective view showing a configuration of a load cell according to a third modification example of the present embodiment.

FIG. 17 shows a configuration of the load cell 10 according to the third modification example of the present embodiment. As shown in FIG. 17, the load cell 10 according to the present modification example is configured to have the tip-end load cell unit 110, an intermediate load cell unit 120, and the base-end load cell unit 130 fixed to the columnar body 100 sequentially in the sequence from the tip end side toward the base end side in the direction of the longitudinal axis. As shown in FIG. 17, each of the tip-end load cell unit 110, the intermediate load cell unit 120, and the base-end load cell unit 130 has the stopper member 200 fixed to the groove portion 152 formed in the lateral surface 102 of the columnar body 100.

In the load cell 10 according to the present modification example, the maximum weighting M1 of the tip-end load cell unit 110, the maximum weighting M2 of the intermediate load cell unit 120, and the maximum weighting M3 of the base-end load cell unit 130 may be set to increase in this sequence. The tip-end load cell unit 110, the intermediate load cell unit 120, and the base-end load cell unit 130 may have different resolutions measurement accuracies).

Similar to the load cell 10 (see FIG. 6) according to the above-described second embodiment, the load cell 10 according to the present modification example has the configuration such that when the weighted object having the weight M larger than the maximum weighting of each load cell unit or the unintentional impact applies on the load cell scale 1, it is possible to prevent the deformation exceeding the limit of the elastic deformation and malfunctions occurring in each load cell unit 110, 120, 130.

The load 10 according to the present modification example, compared with the load cell 10 according to the above-described second embodiment, it is possible to further expand the maximum weighting of the load cell scale 1 with a simple configuration. Accordingly, it is possible to configure a complex load cell scale having the maximum weighting and resolution as desired by combining various load cell units disclosed in the above-described embodiments and modification examples of the present invention.

An example of the load cell 10 according to the present modification that the tip-end load cell unit 110, the intermediate load cell unit 120, and the base-end load cell unit 130 have the same configuration is described, however, the present modification example is not limited thereto. For example, the tip-end load cell unit 110, the intermediate load cell unit 120, and the base-end load cell unit 130 may be configured by combining the various configurations according to the above-described first embodiment and the corresponding modification examples.

(Third Embodiment)

Figure 18:
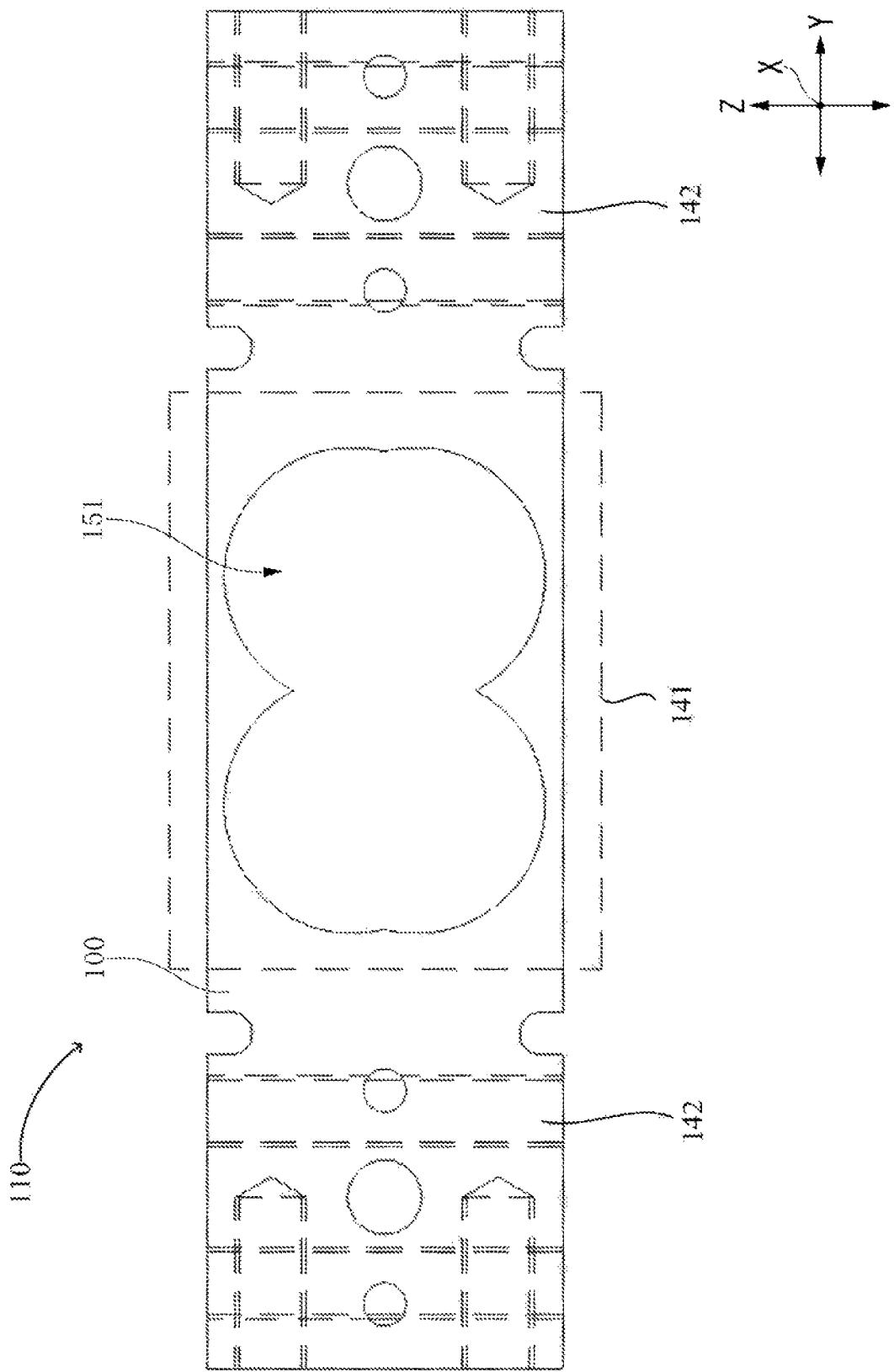
FIG. 18 is a front view showing a configuration of part of the load cell according to a third embodiment of the present invention.
Figure 19:
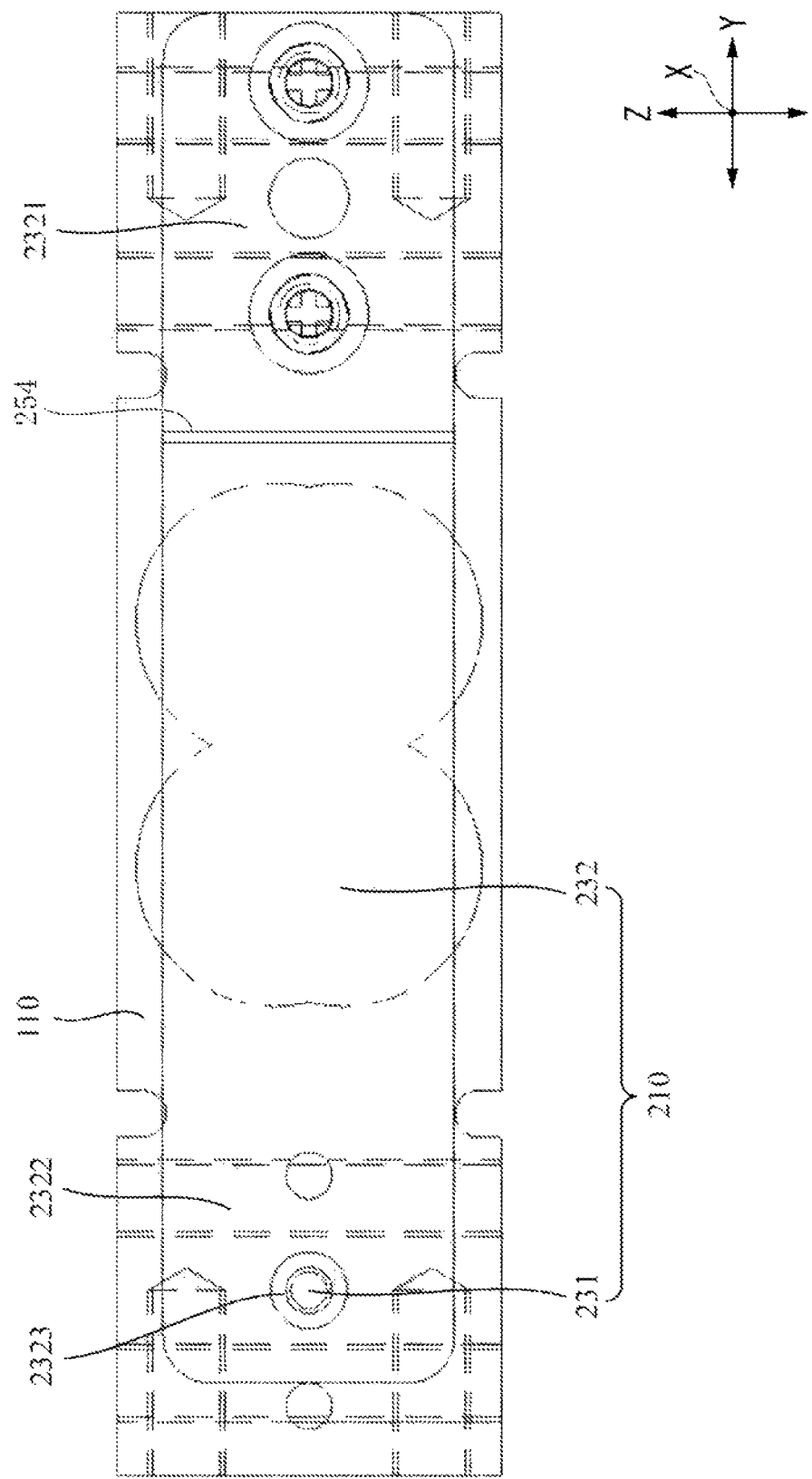
FIG. 19 is a front view showing the configuration of the part of the load cell according to the present embodiment.
Figure 20:
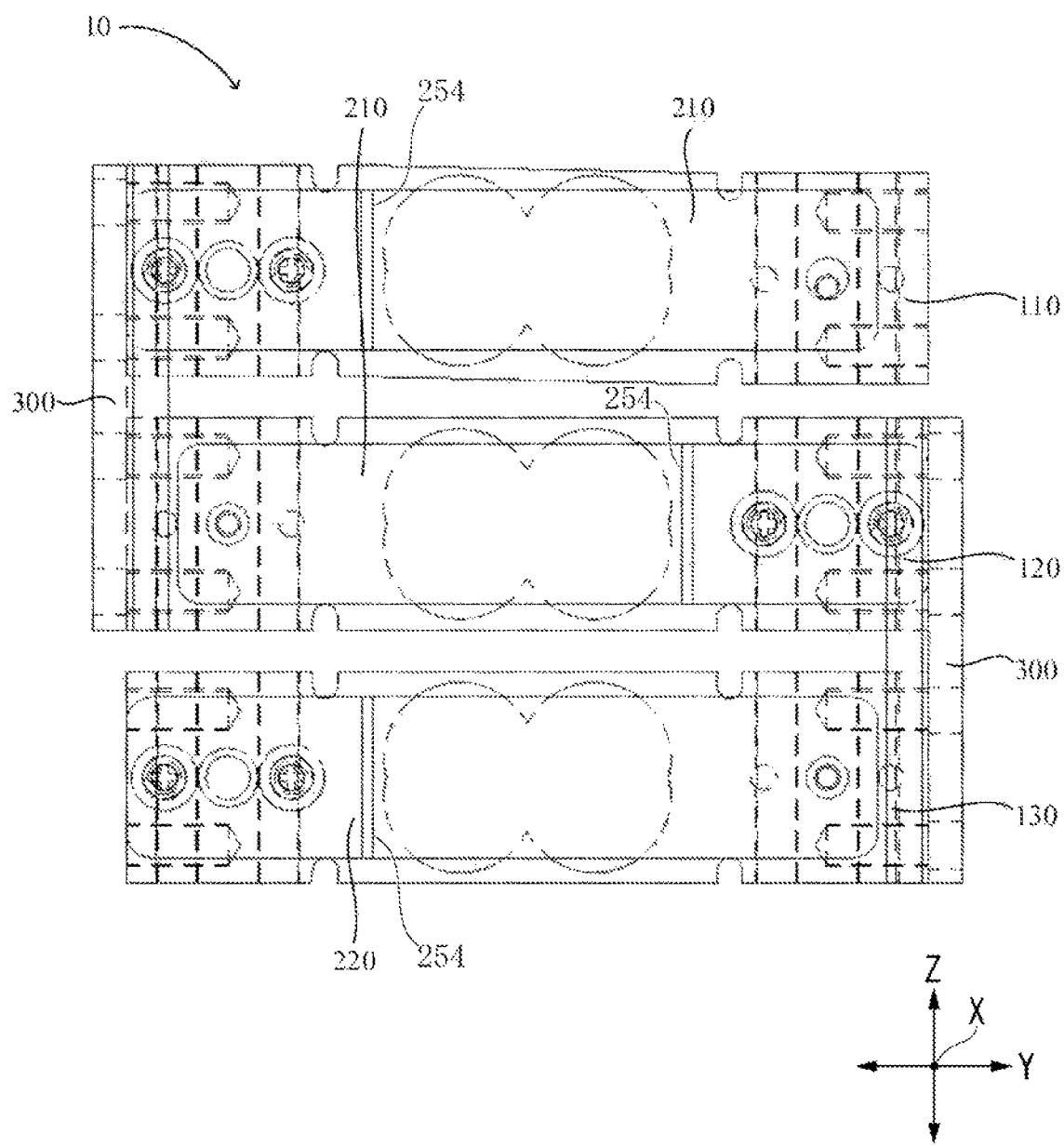
FIG. 20 is a front view showing the configuration of the load cell according to the present embodiment.
Figure 21:
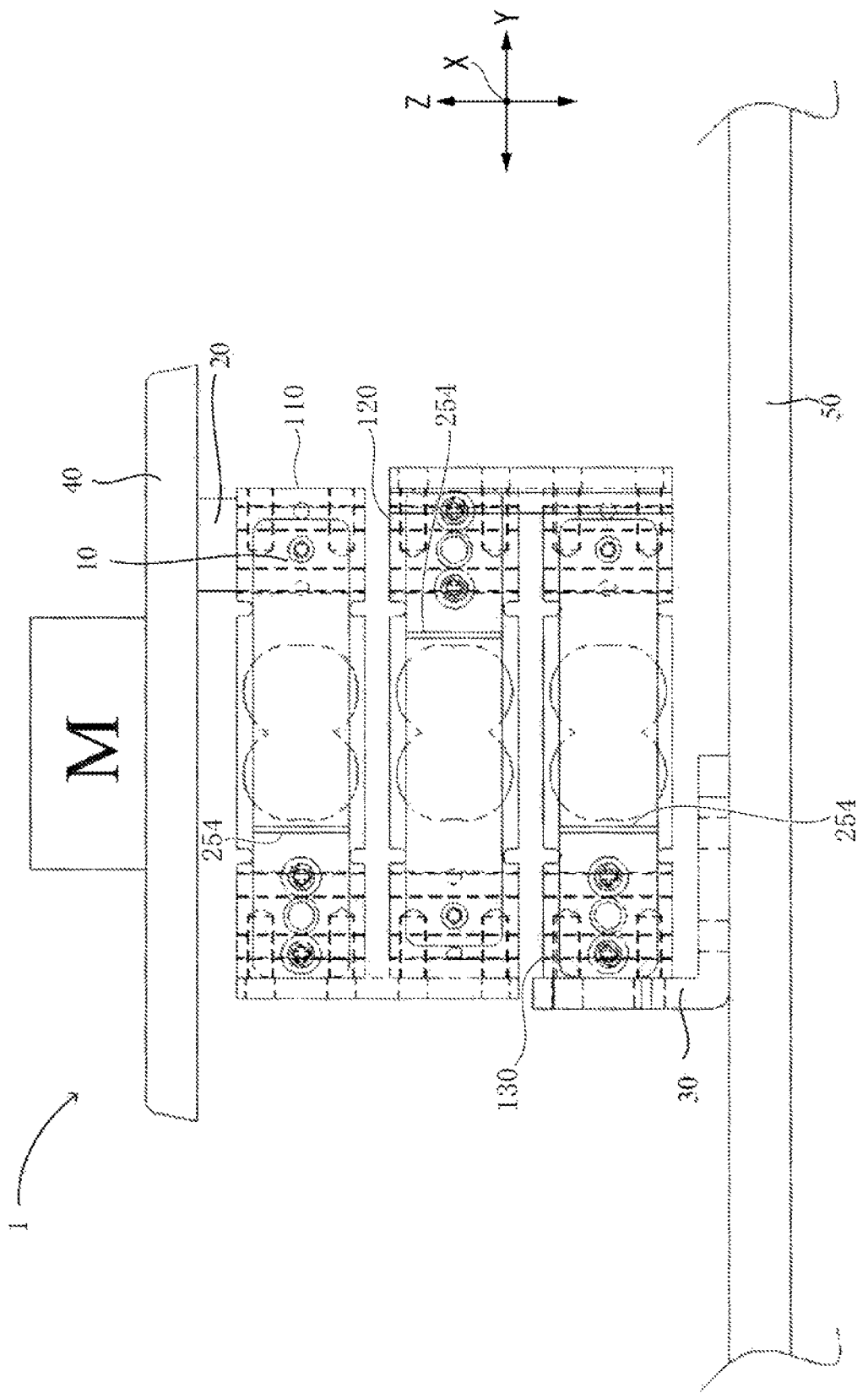
FIG. 21 is a front view showing a configuration of a load cell scale according to the present embodiment.
Figure 22:
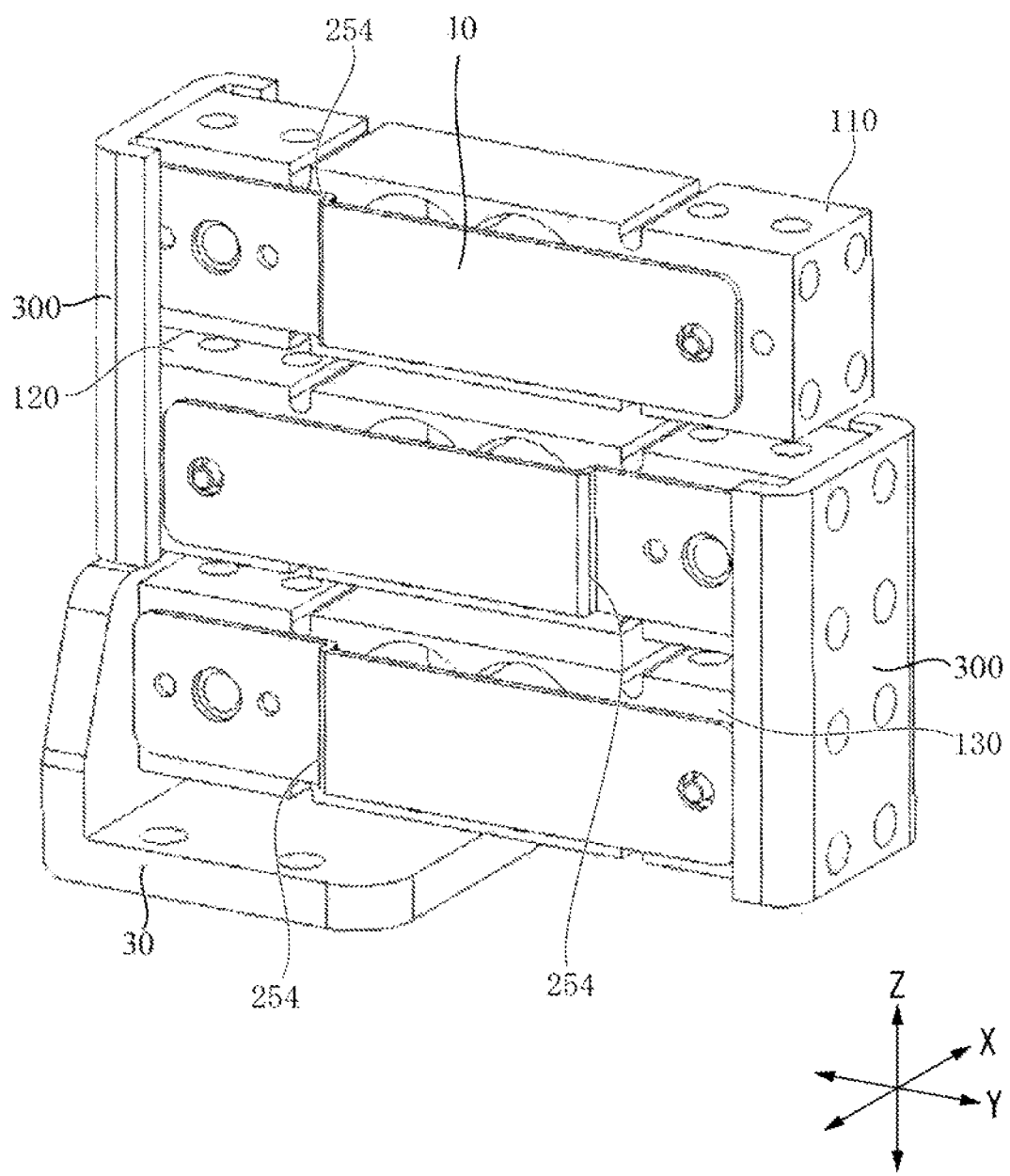
FIG. 22 is a perspective view showing a configuration of the load cell scale according to the present embodiment.
Figure 23:
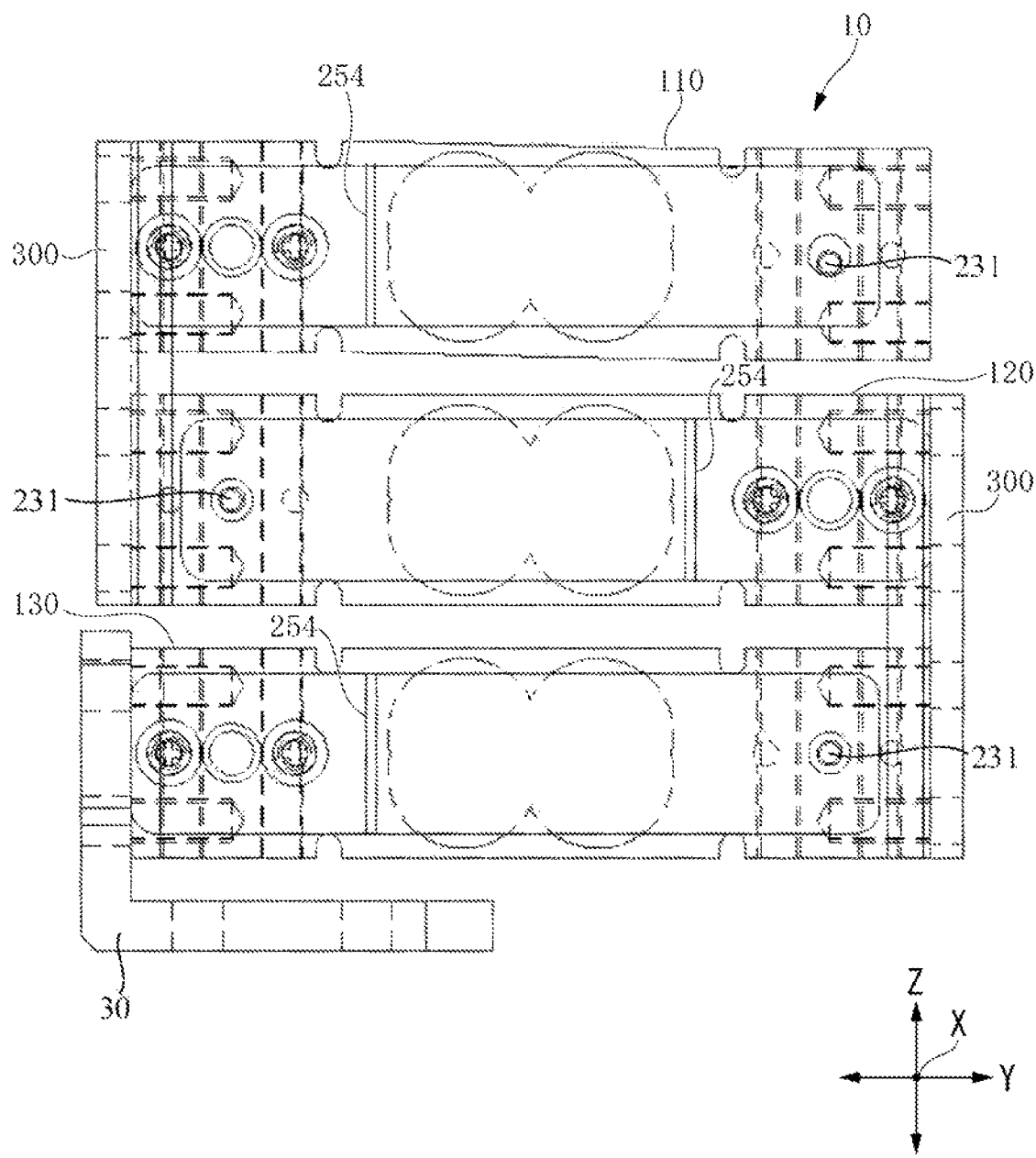
FIG. 23 is a front view showing an operation of the load cell scale according to the present embodiment.
Figure 24:
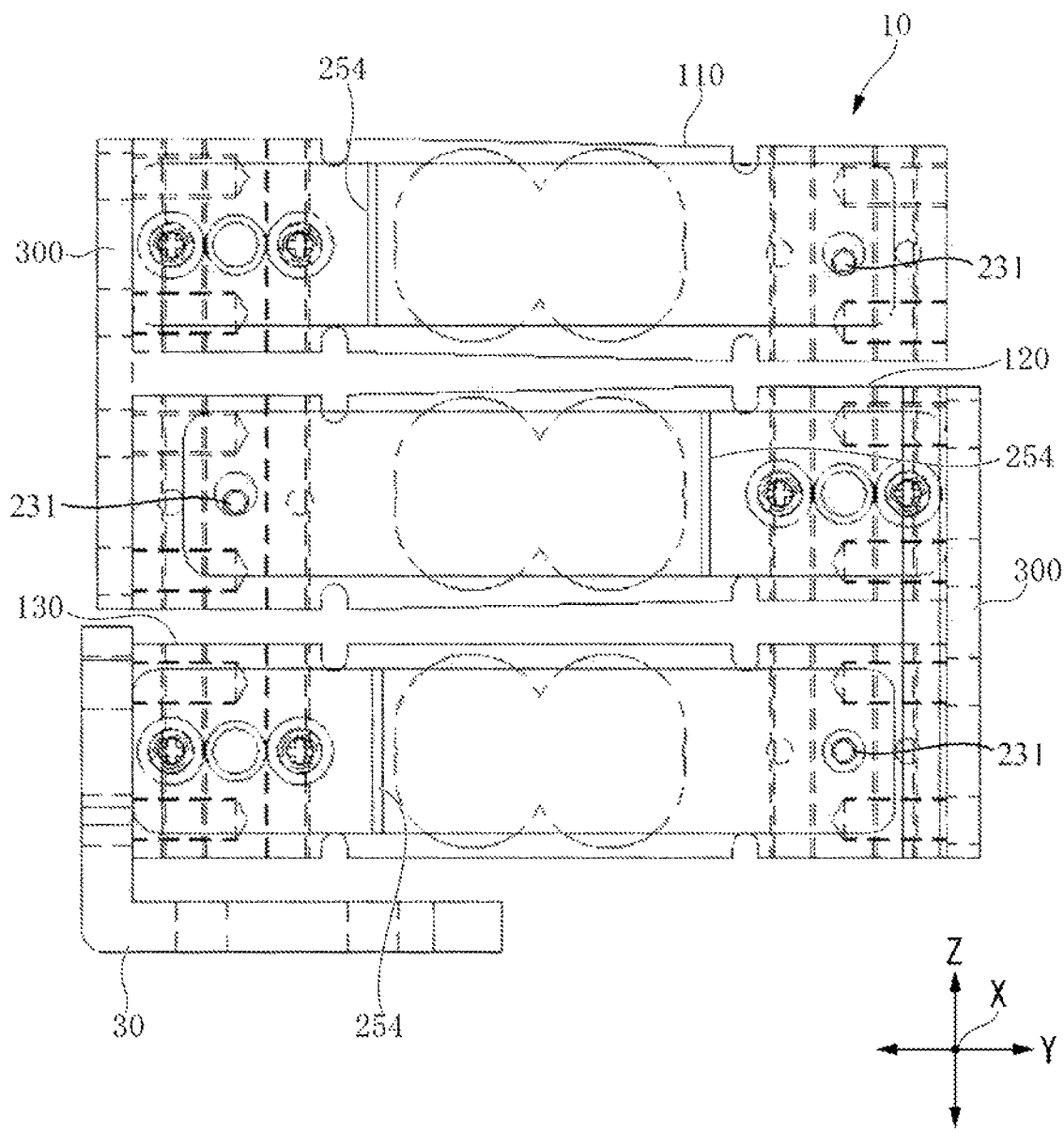
FIG. 24 is a front view showing the operation of the load cell scale according to the present embodiment.

Hereinafter, the load cell 10 and the load cell scale 1 having the load cell 10 according to a third embodiment of the present invention will be described with reference to FIGS. 18-24. FIGS. 18 and 19 are front views showing the configuration of part of the load cell 10 according to the present embodiment, more specifically, showing the configuration of the tip-end load cell unit 110 of the load cell 10. FIG. 20 is a front view showing the configuration of load cell according to the present embodiment. FIGS. 21 and 22 are front view and perspective view showing the load cell scale 1 having the load cell 10 respectively. FIGS 23 and 24 are front views showing the operations of the load cell 10 according to the present embodiment.

As shown in FIG. 20, the load cell 10 according to the present embodiment is configured to have three load cell units connected with each other. More specifically, the load cell 10 according to the present embodiment is configured to have the tip-end load cell unit 110 and the base-end load cell unit 130 indirectly connected via the intermediate load cell unit 120.

As shown in FIGS. 18 and 19, each of the tip-end load cell unit 110, the intermediate load cell unit 120, and the base-end load cell unit 130 according to the present embodiment is configured by connecting the stopper member (second position-restriction member) 232 to the lateral surface of the columnar body 100. For example, in the tip-end load cell unit 110 shown in FIG. 18, the first region 141 having the penetration hole 151 formed as the strain portion and two second regions 142 formed at the two sides of the first region 141 are formed in an intermediate portion in the direction of the longitudinal axis of the columnar body 100. Similar to the above-described embodiments and corresponding modification examples, the first region 141 according to the present embodiment is formed as the deformation region of the tip-end load cell unit 110. As shown in FIG. 19, the tip-end load cell unit 110 has the base-end fixing portion 2321 of the stopper member 232 that is connected and fixed to the columnar body 100 by the fixing mechanism 150. On the other hand, the penetration hole 2323 is formed in the tip-end free portion 2322 of the tip-end load cell unit 110, and the protrusion (first position-restriction member) 231 formed to protrude from the lateral surface at the tip end side of the columnar body 100 is positioned in the penetration hole 2323. According to the present embodiment, the external diameter of the protrusion 231 is smaller than the internal diameter of the penetration hole 2323 such that the protrusion 231 is freely movable in the penetration hole 2323. According to the present embodiment, the combination of the protrusion (first position-restriction member) 231 formed in the columnar body 100 and the stopper member (second position-restriction member) 232 operates as the position-restriction mechanism 210 of the tip-end load cell unit 110. The intermediate load cell unit 120 and the base-end load cell unit 130 may have almost the same configuration with that of the tip-end load cell unit 110.

According to the present embodiment, in order to make the description easy, an example that in FIGS. 18 and 19, the right side in the figures is the base end side of the tip-end load cell unit 110, and the left side in the figures is the tip end side of the tip end load cell unit 110 is described, however, the present embodiment is not limited thereto. For example, as shown in FIGS. 20-22, according to the present embodiment, it is only necessary that the base end side of the tip-end load cell unit 110 and the tip end side of the intermediate load cell unit 120 are connected with each other by a connection member 300 having a predetermined rigidity, and the base end side of the intermediate load cell unit 120 and the tip end side of the base end load cell unit 130 are connected with each other by the connection member 300, the extending direction from the base end side toward the tip end side of each load cell unit is not particularly limited. In other words, according to the present embodiment, the three load cell units 110, 120, 130 only have to be connected with each other to form a hairpin curve shape. For example, when the weighted object having the weight M is disposed on the weighting tray 40 of the load cell scale 1 as described below, it is preferable that the connection member 300 according to the present embodiment has the rigidity suitable for supporting the weighted object, the tip-end load cell unit 110, and the intermediate load cell unit 120, however, the shape and the material of the connection member 300 are not particularly limited.

Figure 26:
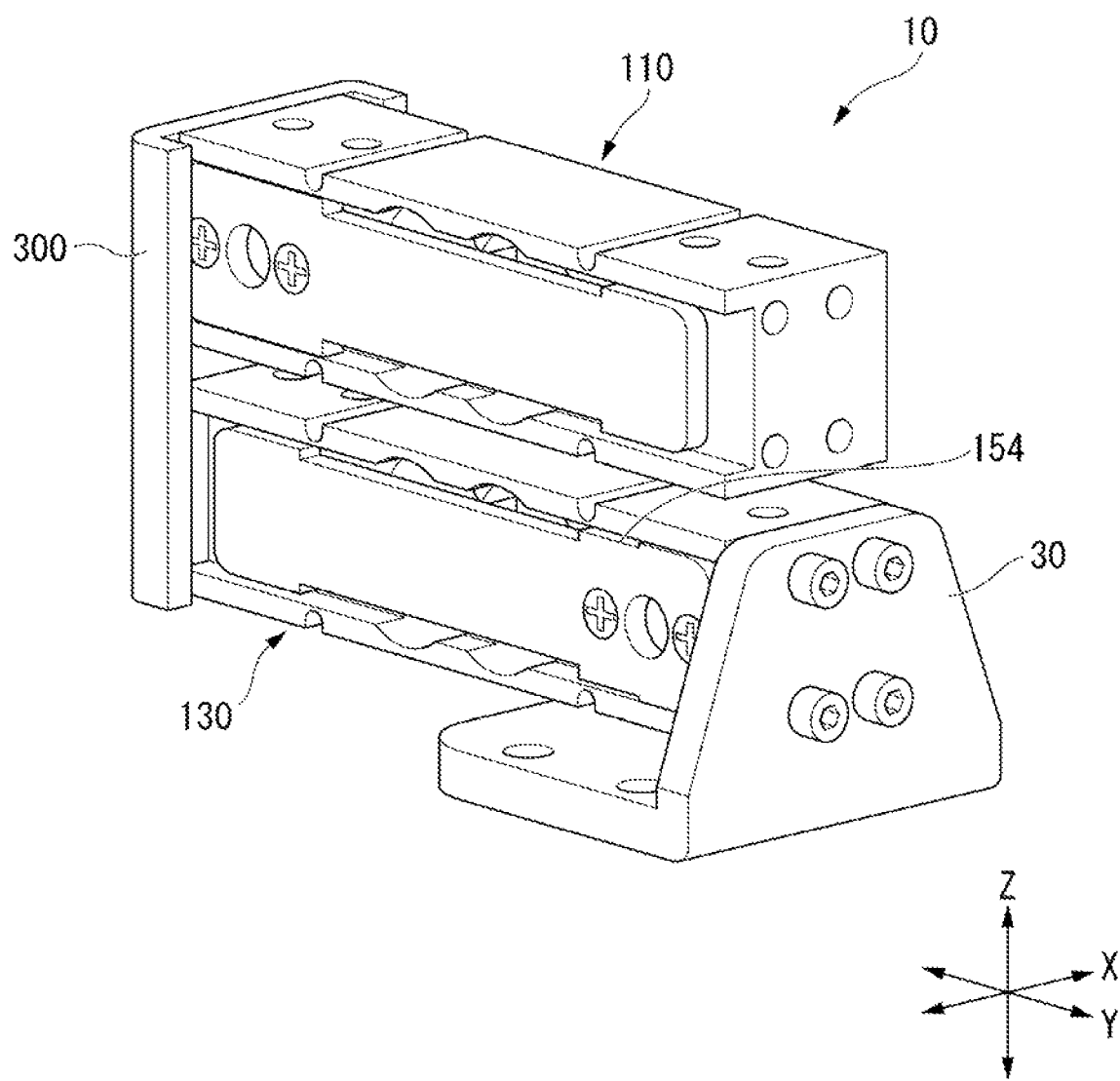
FIG. 26 is a perspective view showing a configuration of a load cell according to a second modification example of the present embodiment.
Figure 27:
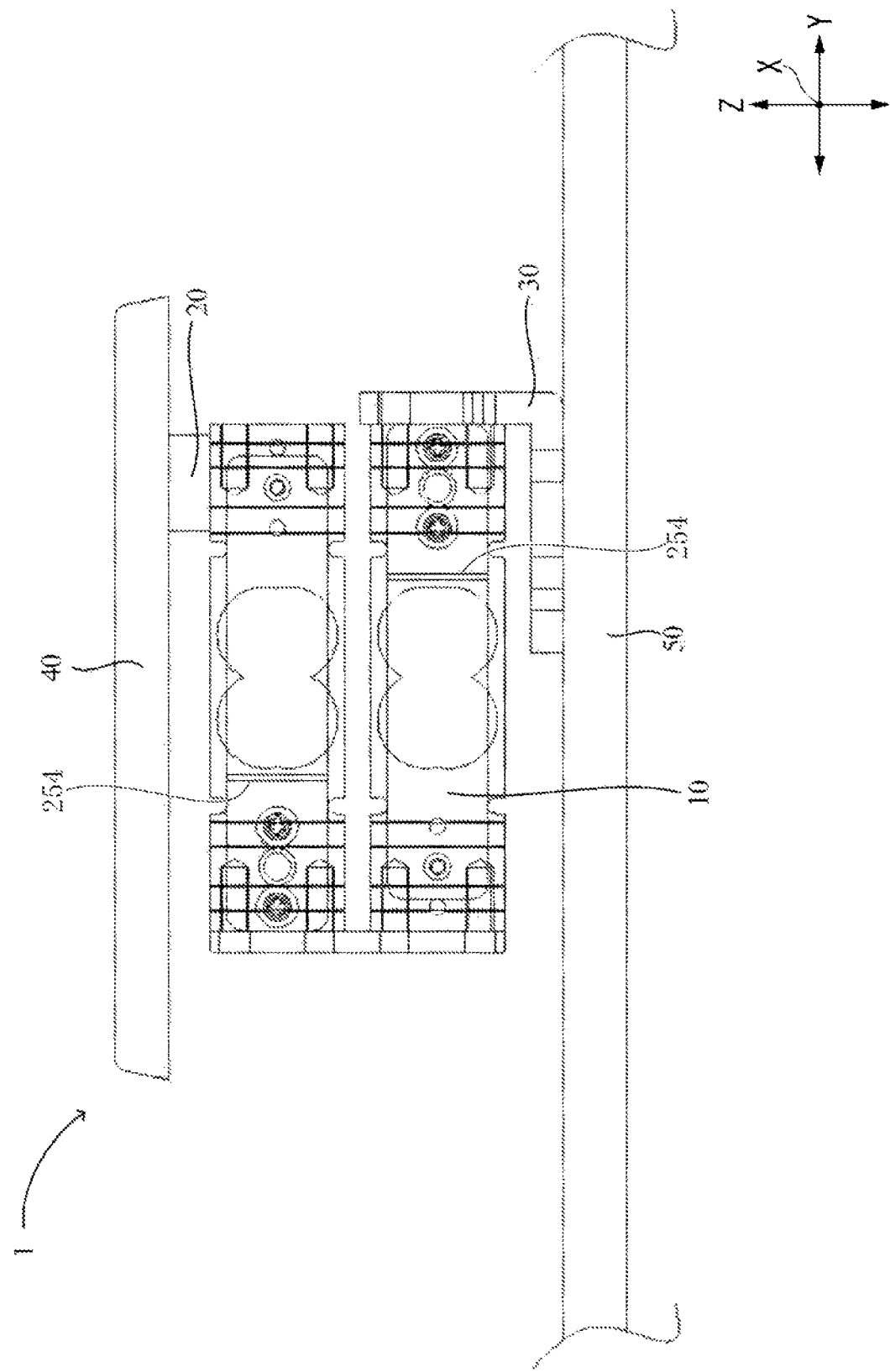
FIG. 27 is a perspective view showing a configuration of a load cell according to a third modification example of the present embodiment.

The load cells according to the above-described embodiments and modification examples are configured by the integrated configuration of various load cell units in the direction of the longitudinal axis, that is, in the horizontal direction. However, as shown in FIG. 20, the tip-end load cell unit 110, the intermediate load cell unit 120, and the base-end load cell unit 130 according to the present embodiment are stacked in the height direction (Z-axis direction, vertical direction) of the load cell 10. The load cell 10 according to the present embodiment has such a module construction such that it is easy to expand the maximum weighting of the load cell 10 by adding the load cell unit. According to the present embodiment, the load cell 10 configured from three load cell units of the tip-end load cell unit 110, the intermediate load cell unit 120, and the base-end load cell unit 130 is described, however, the present embodiment is not limited thereto. For example, as shown in FIGS. 26 and 27, the load cell 10 may be configured by the tip-end load cell unit 110 and the base-end load cell unit 130 only, or the load cell 10 may be configured by equal to or more than four load cell units that is not shown in figures.

In FIGS. 21 and 22, the configuration of the load cell scale 1 having the load cell 10 that is configured by using the connection member 300 to connect the tip-end load cell unit 110, the intermediate load cell unit 120, and the base-end load cell unit 130 is shown. As shown in FIG. 21, the weighting tray 40 is connected to the tip end side of the tip-end load cell unit 110 via the upper support member 20. Also, the base plate 50 is connected to the base end side of the base-end load cell unit 130 via the lower support member 30. Accordingly, when the weighted member having the weight M is disposed on the weighting tray 40 of the load cell scale 1, the weight M of the weighted object can be measured by detecting the deformation amount of each load cell unit in the load cell 10.

Hereinafter, operations of the load cell scale 1 having the load cell 10 according to the present embodiment will be described with reference to FIGS. 23 and 24. Since the load cell scale 1 according to the present embodiment has the load cell 10 configured from three load cell units 110, 120, 130, the maximum weighting suitable for weighting is in three steps. Hereinafter, an example of the load cell 10 according to the present embodiment that the maximum weighting M1 (for example, three kilograms) of the tip-end load cell unit 110, the maximum weighting M2 (for example, six kilograms) of the intermediate load cell unit 120, and the maximum weighting M3 (for example, fifteen kilograms) of the base-end load cell unit are increased in this sequence will be described. For example, the tip-end load cell unit 110, the intermediate load cell unit 120, and the base-end load cell unit 130 may have different resolutions (measurement accuracies).

As shown in FIG. 21, in the case when the weighted object having the weight M is disposed on the weighting tray 40 of the load cell scale 1 according to the present embodiment, operations of the load cell scale 1 will be described according to the relationship of the weight M of the weighted object and each of the maximum weightings of the three load cell units of the load cell 10.

Firstly, the case in which the weight M of the weighted object is less than the maximum weighting M1 of the tip-end load cell unit 110 of the load cell 10 will be described. In this case, the weight M of the weighted object applies to the tip-end load cell unit 110 as the load, and the elastic deformation occurs in the first region 141 as the deformation portion in the tip-end load cell unit 110 such that the protrusion 231 provided in the columnar body 100 moves in the penetration hole 2323 formed in the tip-end free portion 2322 of the stopper member 232; however, the protrusion 231 does not contact with the internal circumferential surface of the penetration hole 2323. In this state, the weight M of the weighted object can be measured by detecting the electrical signals indicating the elastic deformation amount of the first region of the tip-end load cell unit 110.

Next, in the case when the weight M of the weighted object is larger than the maximum weighting M1 of the tip-end load cell unit 110 and less than the maximum weighting M2 of the intermediate load cell unit 120, as shown in FIG. 23, similar to the load cells according to the above-described embodiments and the corresponding modification examples, the protrusion 231 formed in the columnar body 100 of the tip-end load cell unit 110 contacts with the internal circumferential surface of the penetration hole 2323 formed in the tip-end tree portion 2322 of the stopper member 232. In other words, in this state, the protrusion 231 cannot move in the penetration hole 2323 formed in the stopper member 232 such that the elastic deformation of the first region 141 of the tip-end load cell unit 110 is restricted by the stopper member 232. Accordingly, the columnar body 100 and the stopper member 232 in the tip-end load cell unit 110 become the integrated configuration so as to be recognized as part of the configuration at the tip end side of the intermediate load cell unit 120.

In this state, the weight M of the weighted member applies to the intermediate load cell unit 120 as the load, and the protrusion 231 in the intermediate load cell unit 120 moves in the penetration hole 2323 formed in the corresponding stopper member 232. Similar to the operations of the above-described tip-end load cell unit 110, the weight M of the weighted object can be measured by detecting the signals indicating the elastic deformation amount of the first region 141 in the intermediate load cell unit 120. In this state, the first region 141 of the tip-end load cell unit 110 has reached the limit of the elastic deformation; however, the elastic deformation may occur in the first regions 141 of the intermediate load cell unit 120 and the base-end load cell unit 130.

Furthermore, in the case when the weight M of the weighted object is larger than the maximum weighting M2 of the intermediate load cell unit 120 and less than the maximum weighting M3 of the base-end load cell unit 130, as shown in FIG. 24, in the tip-end load cell unit 110 and the intermediate cell unit 120, the protrusion 231 formed in the columnar body 100 contacts the internal circumferential surface of the penetration hole 2323 formed in the corresponding stopper member 232. In other words, the columnar body 100 and the stopper member 232 become the integrated configuration in each of the tip-end load cell unit 110 and the intermediate load cell unit 120. In this state, the weight M of the weighted object applies to the base-end load cell unit 130 as the load such that in the base-end load cell unit 130, the elastic deformation occurs in the first region and the protrusion 231 formed in the columnar body 100 moves in the penetration hole 2323 of the corresponding stopper member 232. Similar to the above-described cases, the weight M of the weighted object can be measured by detecting the signals indicating the elastic deformation amount in the first region 141 of the base-end load cell unit 130.

Even if it is not disclosed in figures, in the case in which the weight M of the weighted object is larger than the maximum weighting of the base-end load cell unit 130, in each of the tip-end load cell unit 110, the intermediate load cell unit 120, and the base-end load cell unit 130 having the load cell 10, the protrusion 231 formed in the columnar body 100 contacts with the internal circumferential surface of the penetration hole 2323 formed in the stopper member 232. Accordingly, in these load cell units 110, 120, 130 of the load cell 10, further elastic deformation in each region 141 is restricted by the corresponding stopper member 232.

According to the load cell 10 disclosed in the present embodiment, similar to the above-described embodiments and modification examples, it is possible to avoid the deformation exceeding the limit of the elastic deformation in the tip-end load cell unit 110, the intermediate load cell unit 120, and the base-end load cell unit 130 and prevent the malfunctions of the load cell 10.

(Modification Example of Third Embodiment)

Hereinafter, a first modification example, a second modification example, and a third modification example of the load cell 10 according to the present embodiment will be described with reference to FIGS. 25-27.

Figure 25:
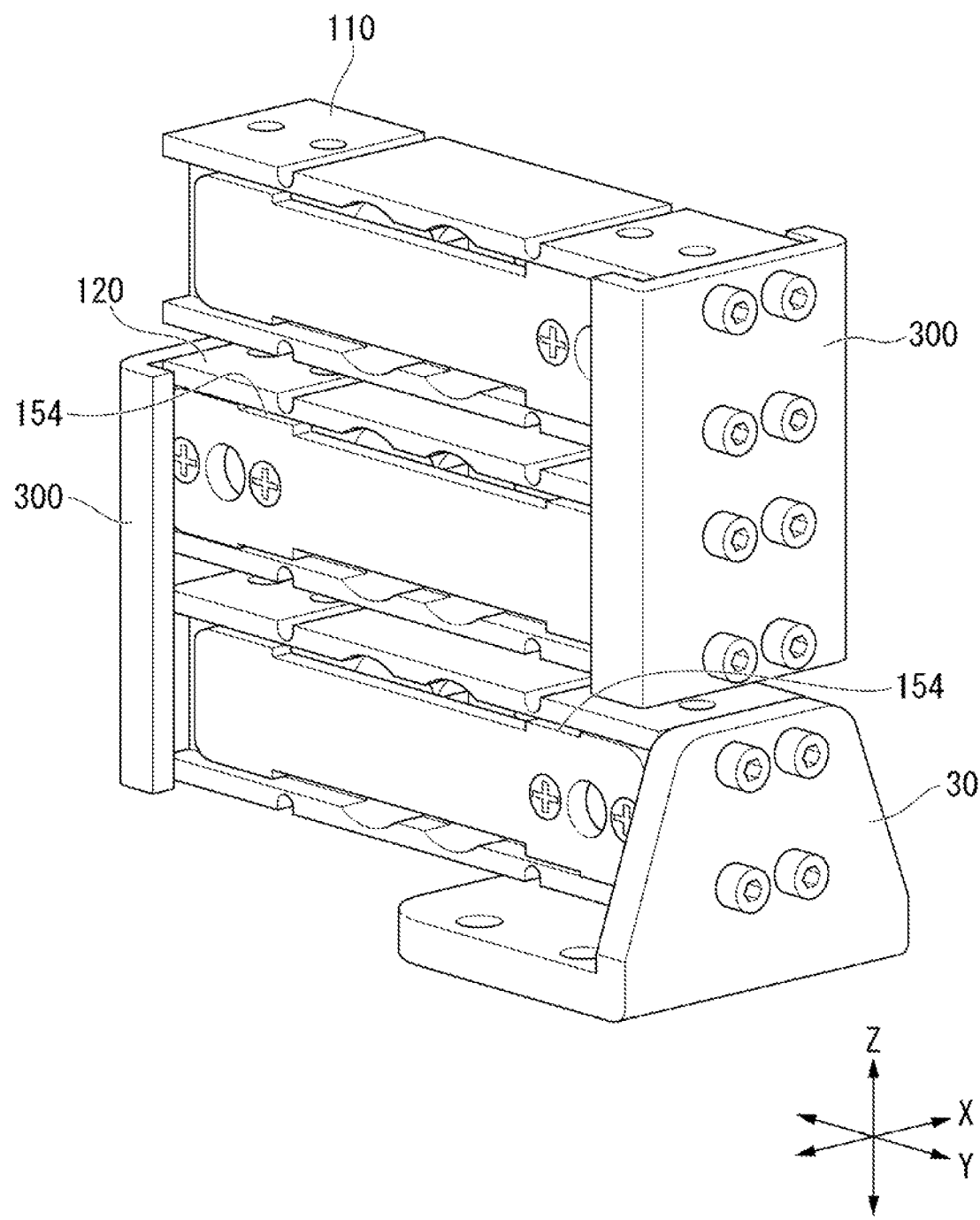
FIG. 25 is a perspective view showing a configuration of a load cell according to a first modification example of the present embodiment.

As shown in FIG. 25, similar to the load cell 10 according to the present embodiment, the load cell 10 according to the first modification example of the present embodiment is configured by using the connection member 300 to connect the tip-end load cell unit 110, the intermediate load cell unit 120, and the base-end load cell unit 130 in the state of being stacked in the vertical direction. In the load cell 10 according to the present modification example, the tip-end load cell unit 110, the intermediate load cell unit 120, and the base-end load cell unit 130 have the same configuration as that of the load cell 10 (see FIGS. 1-3) according to the first embodiment.

FIG. 26 shows the configuration of the load cell 10 according to the second modification example of the present embodiment. As shown in FIG. 26, the load cell 10 according to the present modification example is configured by using the connection member 300 to connect the tip-end load cell unit 110 and the base-end load cell unit 130 in the state of being stacked in the vertical direction. Similar to the above-described first modification example of the present embodiment, the tip-end load cell unit 110 and the base-end load cell unit 130 have the same configuration as that of the load cell 10 (see FIGS. 1-3) according to the first embodiment. It is possible to configure a further compact load cell scale 1 using the load cell 10 according to the present modification example and correspond to the weighting for a relative light weighted object.

FIG. 27 shows the configuration of the load cell according to the third modification example of the present embodiment. The load cell 10 according to the present modification example is different from the second modification example of the present embodiment in the configurations of the tip-end lead cell unit 110 and the base-end load cell unit 130. More specifically, the tip-end load cell unit 110 and the base-end load cell unit 130 have the same configuration as that of each load cell unit of the load cell 10 (see FIGS. 18 and 19) according to the third embodiment.

As described above, several modification examples of the load cell 10 according to the present embodiment are described, however, the present embodiment is not limited thereto. The several modification examples of the present embodiment are used to describe the feature that it is easy to expand the weighting of the load cell using the modulated load cell units in the load cell 10. For example, in the several modification examples, it is described that the several load cell units included in the load cell have the same configuration, however, the present embodiment is not limited thereto. In other words, in the load cell 10 according to the present embodiment and each modification example, the load cell having different configuration according to the first embodiment and the corresponding modification examples may be suitably combined.

According to the load cell 10 disclosed in the present embodiment and each modification example, it is easy to expand the weighting and it is possible to avoid the deformation exceeding the limit of the elastic deformation in each load cell unit configuring the load cell 10 by using a simple configuration so as to prevent the malfunctions of the load cell 10.

(Fourth Embodiment)

Hereinafter, a fourth embodiment of the present invention will be described with reference to FIGS. 28 and 29. FIG. 18 is a perspective view showing a configuration of the load cell according to the present embodiment. FIG. 29 is a cross-sectional view along the break line A-A in FIG. 28.

Figure 28:
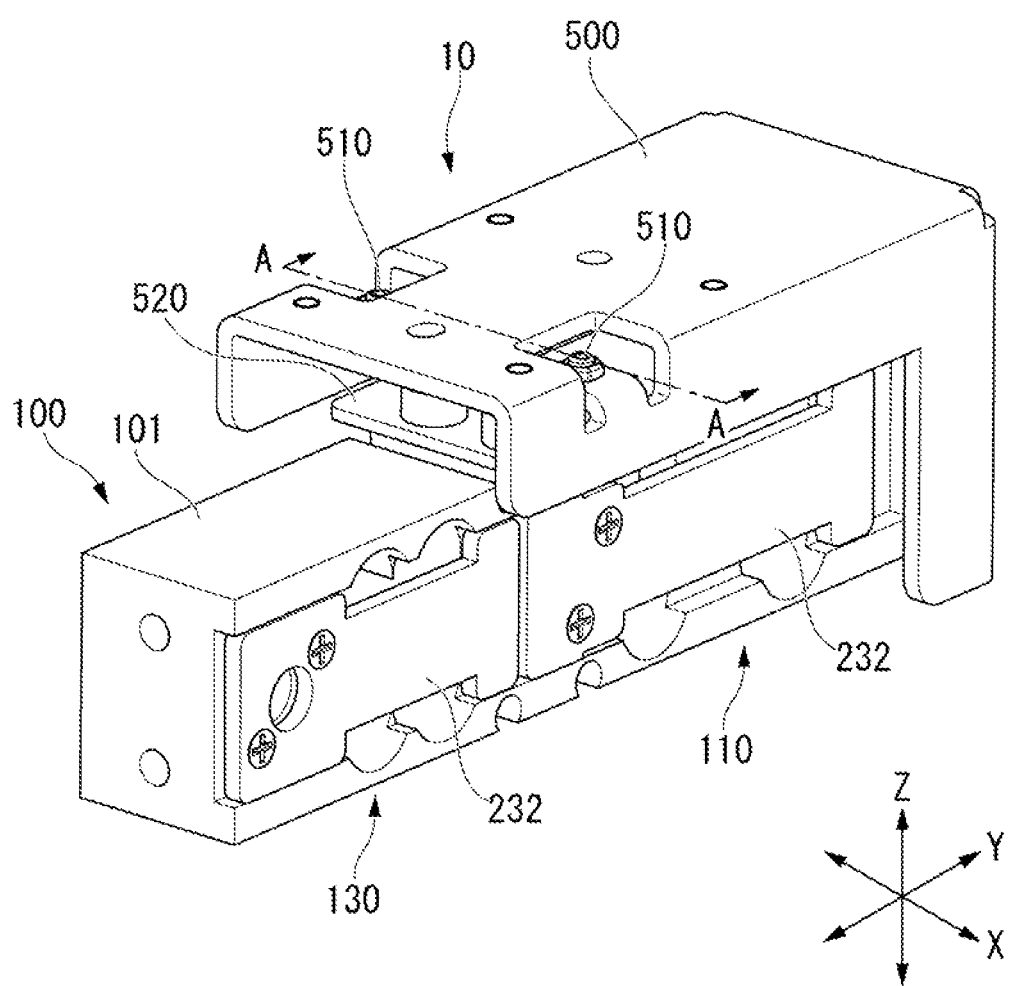
FIG. 28 is a perspective view showing a configuration of a protection member of the load cell according to a fourth embodiment of the present invention.
Figure 29:
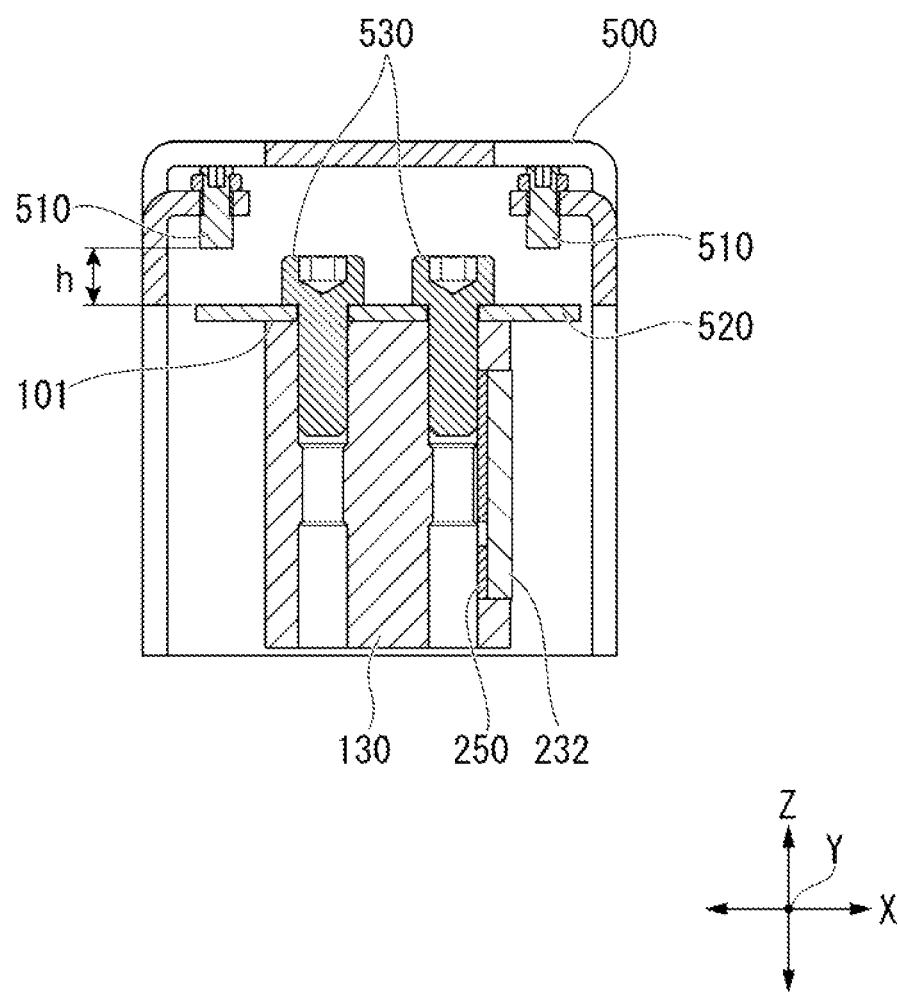
FIG. 29 is a cross-sectional view along the break line A-A in FIG. 28.

As shown in FIG. 28, the load cell 10 according to the present embodiment is configured to have a protection member 500 attached to the load cell 10 according to the second embodiment. As shown in FIG. 28, in the load cell 10 according to the present embodiment, the protection member 500 connected to the tip-end load cell unit 110, for example, is fixed to the tip end surface of the tip-end load cell unit 110 in a state of covering at least part of the tip-end load cell unit 110.

More specifically, as shown in FIG. 29, in the upper surface 101 of the columnar body 100 of the load cell 10, a plate-shaped member 520 is connected and fixed thereto by screws 530. On the other hand, the protection member 500 has two second stopper members 510 at positions facing the plate-shaped member 520 along the height direction of the load cell 10. According to the present embodiment, as shown in FIG. 28, for example, the second stopper member 510 may be configured by using the screw attached to the top plate of the protection member 500, however, the second stopper member 510 is not limited thereto. For example, the second stopper member 510 may be a pin protruding from the top plate of the protection member 500 toward the plate-shaped member 520. As shown in FIG. 29, when an external force is not applied to the load cell 10, the second stopper member 510 and the plate-shaped member 520 are separated from each other by a distance h. As described below, the second stopper member 510 has a width in the short direction of the plate-shaped member 520 such that in the case when the top plate of the protection member 500 receives the external force to be bent, the second stopper member 510 moves downward to contact with the plate-shaped member 520. According to the present embodiment, the protection member 500 and the plate-shaped member 520 may be formed from the metal materials having the predetermined rigidity.

In the load cell 10 according to the present embodiment, the combination of the protection member 500 and the plate-shaped member 520 fixed to the load cell 10 is configured to protect each configuration of the load cell 10 from any unintentional external impact. More specifically, in the case when the external force that is much larger than the maximum weighting of the load cell 10 applies on the load cell 10, for example, when a baggage having a weight of 150 kilograms that is 10 times of the maximum weighting as 15 kilograms of the load cell 10 falls and collides with the load cell 10, at is possible that the real-time impact to the load cell 10 is much larger than the considerable impact to the stopper member 232 provided in the load cell 10. In this state, since the impact cannot be absorbed only by the stopper member 232, it is possible that the deformation exceeding the limit of elastic deformation occurs in the load cell 10 so as to generate the permanent strain therein.

According to the load cell 10 disclosed in the present embodiment, at the time when the external unintentional impact applies, the force due to the impact firstly applies to the protection member 500. When the protection member 500 receives the force, the top plate bends downwardly in the height direction of the load cell 10 to deform. Accordingly, as shown in FIG. 29, the second stopper members 510 provided in the protection member 500 moves downwardly toward the plate-shaped member 520. In other words, distance h between the second stopper members 510 and the plate shaped member 520 decreases. When the force due to the external impact is large, the second stopper members 510 moves downwardly until the second stopper members 510 contact with the plate-shaped member 520. Also, since the protection member 500 is connected with the tip-end load cell unit 110 of the load cell 10, path of the force is transmitted to the tip-end load cell unit 110 such that stopper member 232 included in the tip-end load cell unit 110 moves simultaneously. Furthermore, in some cases, the stopper member 232 included in the base-end load cell unit 130 also moves simultaneously.

That is, when the unintentional impact applies to the load cell 10 according to the present embodiment, the second stopper member 510 included in the protection member 500, the stopper members 232 provided in the tip-end load cell unit 110 and the base-end load cell unit 130 of the load cell 10 moves simultaneously such that the protection member 500, the columnar body 100 of the load cell 10 and the various stopper member 232 contact with each other to become the integrated configuration. According to the present embodiment, the protection member 500 has a large force receiving area for receiving the force from the height direction of the load cell 10 and the protection member 500 is formed from the material having the predetermined rigidity Accordingly, it is considerable that the rigidity of the configuration formed by combining the columnar body 100 and the stopper member 232 of the load cell 10 together with the protection member 500 can be significantly improved.

According to the load cell 10 disclosed in the present embodiment, in the case in which the stopper member 232 is not provided in the tip-end load cell unit 110, it is also possible to avoid the unintentional deformation in the tip-end load cell unit 110 and the base-and load cell unit only by the operations of the protection member 500.

According to the above description, due to the load cell 10 according to the present embodiment, even if the unintentional impact applies to the load cell 10, it is possible to avoid the deformation exceeding the limit of the elastic deformation in each load cell unit of the load cell 10 by the protection member 500 so as to prevent the malfunctions in the load cell 10. According to the present embodiment, in the case when the second stopper member 510 is configured by the screw, it is considerable to adjust the magnitude of the impact that can be absorbed by the protection member 500 by only adjusting the distance between the second stopper member 510 and the plate-shaped member 520.

The configuration of the protection member 500 in the load cell 10 according to the present embodiment is described based on the configuration example shown in FIGS. 28 and 29, however, the configuration of the protection member 500 is not limited thereto. In the present embodiment, for example, the second stopper member 510 may be provided in the upper support member 20 (see FIG. 10) according to the second embodiment.

In the present description, the phrases showing positional relationship such as "upper", "lower", "tip end", "base end", "left side", "right side", "vertical", "horizontal", "top", "bottom", "internal", and "external" are used. However, such phrases are only used to make the description easy and indicate the positional relationship shown in the enclosed figures. In other words, the configurations according to each embodiment and modification example of the present invention are not limited by these phrases.

The embodiments of the invention have been described above with reference to the drawings, but specific structures of the invention are not limited to the embodiments and may include various modifications without departing from the scope of the invention The invention is not limited to the above-mentioned embodiments and is limited only by the accompanying claims.

[Industrial Applicability]

According to the embodiments described above, it is possible to provide a load cell configured to restrict the deformation occurring in the load cell in a case when the load exceeding the weighting applies to the load cell, and a load cell scale having the load cell. Also, according to the embodiments described above, it is possible to provide a load cell scale configured by several load cells having different weightings so as to correctly switch the weightings and measure the weight of the weighted object.

REFERENCE SIGNS LIST 1 load cell scale
10, 10a, 10b load cell
100, 100a columnar body
101 upper surface
102 lateral surface
103 end surface
110 tip-end load cell unit
120 intermediate load cell unit
130 base-end load cell unit
141 first region
142 second region
150 fixing mechanism
151 penetration hole
152 groove portion
154 step portion
200, 200A, 200B, 232 stopper member (second position-restriction member)
210 position-restriction mechanism
231 protrusion (position-restriction tank, first position-restriction member)
250 intermediate member
254 step member
500 protective material
510 second stopper member
520 plate-shaped member
530 screws
2311 groove portion
2321 base-end fixing portion
2322 tip-end free portion
2323 penetration hole
H1, H2, H3, H4, H5 width
L longitudinal axis
M weight
M1, M2, M3 maximum weighing
X, Y, Z, axis

The invention claimed is:

1. A load cell scale, comprising
a load cell part formed in a columnar shape, the load cell part having an upper surface extending along a longitudinal axis and a lateral surface intersecting with the upper surface, and the load cell part having a first load cell with a first weighting and a second load cell with a second weighting, and
a stopper part configured to restrict deformation occurring in the load cell due to a load exceeding a predetermined value and applied to the load cell part, the stopper part being configured to correspond to either of the first load cell or the second load cell, wherein the load cell part has the first load cell and the second load cell to be disposed along a longitudinal direction, wherein the load cell part has a strain portion capable of elastically deforming and the strain portion penetrates the first load cell and the second load cell from the lateral surface in a short direction orthogonal to the longitudinal direction, wherein the stopper part is a plate-shaped member formed to extend along the longitudinal direction, the stopper part comprising:
 a fixing-end portion fixed to the lateral surface of the first load cell and the second load cell; and
 a free-end portion separating from the fixing-end portion along the longitudinal axis, the free-end portion being configured to restrict the elastic deformation of the load cell part due to the load in a state when the fixing-end portion is fixed to the lateral surface, wherein the stopper part has a first stopper and a second stopper corresponding to the first load cell and the second load cell respectively, wherein the lateral surface of the first load cell and the second load cell has a groove formed along the direction of the longitudinal axis, wherein the fixing-end portion of the first stopper and the free-end portion of the second stopper are adjacent to each other within the groove, wherein when the load being less than the first weighting is applied to the first load cell, the elastic deformation occurs in the first load cell and the free-end portion of the first stopper and the first load cell relatively approach, wherein, when the load being larger than the first weighting and less than the second weighting is applied to the first load cell, the elastic deformation occurs in the second load cell and the free-end portion of the second stopper and the second load cell relatively approach in a state in which the first stopper and the first load cell are engaged with each other, wherein the load cell scale further comprises a protection member fixed to the first load cell, and wherein, when the load larger than the first weighting is applied, the first load cell and the protection member operate simultaneously so as to avoid a permanent strain occurring in the first load cell.

2. The load cell scale according to claim 1, wherein, when dimensions of the stopper part in a height direction orthogonal to the upper surface is defined as a width of the stopper part, the stopper part has a first width at the fixing-end portion and a second width in a range where the strain portion is formed along the longitudinal axis, and
 wherein the first width of the stopper part is larger than the second width of the stopper part.

3. The load cell scale according to claim 2, wherein the fixing-end portion of the stopper part has a third width between the first width and the second width.

4. The load cell scale according to claim 2, wherein the free-end portion of the stopper part has a fourth width between the first width and the second width.

5. The load cell scale according to claim 1, further comprising an intermediate member formed to be sandwiched between the load cell part and a portion where the stopper part is fixed to the lateral surface along the short direction.

* * * * *